United States Patent
Lindahl et al.

(10) Patent No.: US 9,764,827 B2
(45) Date of Patent: Sep. 19, 2017

(54) HYDRAULIC STRUT ASSEMBLY FOR SEMI-LEVERED LANDING GEAR

(71) Applicant: The Boeing Company, Chicago, IL (US)

(72) Inventors: Gary M. Lindahl, Newcastle, WA (US); Eric Howard Nelson, Bothell, WA (US); Mitchell Loren Ray Mellor, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 304 days.

(21) Appl. No.: 14/697,621

(22) Filed: Apr. 28, 2015

(65) Prior Publication Data

US 2016/0207616 A1    Jul. 21, 2016

Related U.S. Application Data

(63) Continuation of application No. 13/474,332, filed on May 17, 2012, now abandoned, which is a
(Continued)

(51) Int. Cl.
*B64C 25/60* (2006.01)
*B64C 25/22* (2006.01)
(Continued)

(52) U.S. Cl.
CPC ............ *B64C 25/60* (2013.01); *B64C 25/22* (2013.01); *B64C 25/34* (2013.01); *B64C 25/36* (2013.01); *F15B 15/16* (2013.01)

(58) Field of Classification Search
CPC ......... B64C 25/60; B64C 25/22; B64C 25/34; B64C 25/36; F15B 15/16
See application file for complete search history.

(56) References Cited

U.S. PATENT DOCUMENTS 2,193,736 A    3/1940  Onions
2,783,744 A    3/1957  Tennis
(Continued)

FOREIGN PATENT DOCUMENTS

GB    1591689 A    6/1981
JP    2002506772 A    3/2002
(Continued)

OTHER PUBLICATIONS

Office Action, dated Jul. 21, 2015, regarding U.S. Appl. No. 14/479,319, 33 pages.
(Continued)

*Primary Examiner* — Christopher P Ellis
*Assistant Examiner* — Jessica Wong
(74) *Attorney, Agent, or Firm* — Yee & Associates, P.C.

(57) ABSTRACT

A hydraulic strut assembly, for use in a semi-levered landing gear in an aircraft, comprising an actuator and a manifold associated with the actuator. The actuator comprises a housing, a first piston, a second piston, and a third piston. The first piston is positioned between outer and inner cylindrical structures of the housing. The outer and inner cylindrical structures and first piston form an outer chamber that receives a first fluid. The inner cylindrical structure, the first piston, and the second piston, which is nested within the first piston, form an inner chamber, which holds a second fluid comprising a gas. A volume of the inner chamber changes when at least one of the first and second pistons moves. The third piston is positioned between the outer cylindrical structure and the first piston. The first, second, and third pistons move in a direction parallel to an axis through the housing.

14 Claims, 17 Drawing Sheets

Related U.S. Application Data continuation-in-part of application No. 12/951,861, filed on Nov. 22, 2010, now Pat. No. 9,481,452.

(51) Int. Cl.
*B64C 25/34* (2006.01)
*F15B 15/16* (2006.01)
*B64C 25/36* (2006.01)

(56) References Cited

U.S. PATENT DOCUMENTS

| | | | |
|---|---|---|---|
| 2,932,281 A | 4/1960 | Moskowitz | |
| 3,082,980 A | 3/1963 | Lucien | |
| 3,083,937 A | 4/1963 | Bainbridge et al. | |
| 3,188,922 A | 6/1965 | Cruse | |
| 3,237,726 A | 3/1966 | Deyerling | |
| 3,322,376 A | 5/1967 | Neilson et al. | |
| 3,335,642 A | 8/1967 | Rosaen | |
| 3,426,651 A | 2/1969 | Arendarski | |
| 3,533,613 A | 10/1970 | Bendicsen | |
| 3,568,705 A | 3/1971 | Boyadjieff et al. | |
| 3,578,303 A | 5/1971 | Fullam | |
| 3,724,832 A | 4/1973 | Ceska | |
| 3,845,919 A | 11/1974 | Jenny | |
| 3,869,861 A | 3/1975 | Case | |
| 3,920,084 A * | 11/1975 | Russell, Jr. | E21B 3/04 173/79 |
| 4,007,894 A | 2/1977 | Hartel | |
| 4,061,295 A | 12/1977 | Somm | |
| 4,075,929 A | 2/1978 | Peterson | |
| 4,088,286 A | 5/1978 | Masclet et al. | |
| 4,284,255 A | 8/1981 | Masclet et al. | |
| 4,291,850 A | 9/1981 | Sharples | |
| 4,359,199 A | 11/1982 | Kramer et al. | |
| 4,381,857 A | 5/1983 | Cook | |
| 4,402,477 A | 9/1983 | Turiot et al. | |
| 4,445,672 A | 5/1984 | Turiot | |
| 4,457,212 A | 7/1984 | Unger et al. | |
| 4,746,086 A | 5/1988 | Happ | |
| 4,749,152 A | 6/1988 | Veaux et al. | |
| 4,749,452 A | 6/1988 | LaConti et al. | |
| 4,770,372 A | 9/1988 | Ralph | |
| 4,869,444 A | 9/1989 | Ralph | |
| 4,892,270 A | 1/1990 | Derrien et al. | |
| 4,940,197 A | 7/1990 | Putnam | |
| 5,029,775 A | 7/1991 | Abramovitsh | |
| 5,086,995 A | 2/1992 | Large | |
| 5,094,407 A | 3/1992 | Jampy et al. | |
| 5,140,894 A | 8/1992 | Snyder et al. | |
| 5,148,896 A | 9/1992 | Ralph | |
| 5,158,267 A | 10/1992 | Pascal | |
| 5,219,152 A | 6/1993 | Derrien et al. | |
| 5,271,314 A | 12/1993 | Derrien | |
| 5,299,761 A | 4/1994 | Robin et al. | |
| 5,310,140 A | 5/1994 | Veaux et al. | |
| 5,390,586 A | 2/1995 | Jones | |
| 5,396,973 A | 3/1995 | Schwemmer et al. | |
| 5,429,323 A | 7/1995 | Derrien et al. | |
| 5,460,340 A | 10/1995 | White | |
| 3,290,038 A | 12/1996 | Tollar | |
| 5,908,174 A | 6/1999 | Churchill et al. | |
| 6,182,925 B1 | 2/2001 | Kilner et al. | |
| 6,237,407 B1 | 5/2001 | Nance | |
| 6,345,564 B1 | 2/2002 | Kilner et al. | |
| 6,575,405 B2 | 6/2003 | Bryant et al. | |
| 7,426,983 B2 | 9/2008 | Ducos et al. | |
| 7,802,488 B2 | 9/2010 | Bucheton et al. | |
| 8,104,711 B2 | 1/2012 | Bennett et al. | |
| 2003/0033927 A1 | 2/2003 | Bryant et al. | |
| 2005/0011991 A1 | 1/2005 | Ducos et al. | |
| 2006/0220917 A1 | 10/2006 | Nance | |
| 2007/0068754 A1 | 3/2007 | Furgala | |
| 2007/0144846 A1 | 6/2007 | Bucheton et al. | |
| 2007/0194172 A1 | 8/2007 | Luce et al. | |
| 2009/0050736 A1 | 2/2009 | Bennett et al. | |
| 2009/0108131 A1 | 4/2009 | Lavigne et al. | |
| 2009/0200760 A1 | 8/2009 | Gartner et al. | |
| 2009/0210105 A1 | 8/2009 | Lusby et al. | |
| 2010/0096499 A1 | 4/2010 | Luce et al. | |
| 2010/0116930 A1 | 5/2010 | Griffin | |
| 2010/0116931 A1 | 5/2010 | Wilby | |
| 2010/0181423 A1 | 7/2010 | Martin et al. | |
| 2010/0187353 A1 | 7/2010 | Masson et al. | |
| 2010/0219290 A1 | 9/2010 | Luce | |
| 2011/0025968 A1 | 2/2011 | Yu et al. | |
| 2011/0233327 A1 | 9/2011 | Mellor et al. | |
| 2012/0126055 A1 | 5/2012 | Lindahl et al. | |
| 2012/0211600 A1 | 8/2012 | Mellor | |
| 2012/0247892 A1 | 10/2012 | Cottet | |
| 2013/0119196 A1 | 5/2013 | Lindahl et al. | |
| 2015/0266592 A1 | 9/2015 | Mellor et al. | |

FOREIGN PATENT DOCUMENTS

| | | |
|---|---|---|
| JP | 2002200976 A | 7/2002 |
| JP | 2009505884 A | 2/2009 |
| WO | WO2009047367 A2 | 4/2009 |

OTHER PUBLICATIONS

European Patent Office Communication, dated Feb. 16, 2016, regarding Application No. 12156210.2, 4 pages.

Office Action, dated Mar. 24, 2015, regarding U.S. Appl. No. 14/479,319, 14 pages.

State Intellectual Property Office of PRC Notification of First Office Action and English Translation, dated Mar. 3, 2015, regarding Application No. 201110386094.7, 12 pages.

Notice of Reasons for Rejection and English Translation dated Apr. 30, 2015, regarding Japanese Patent Application No. 2011-242030, 7 pages.

Final Office Action, dated Nov. 13, 2014, regarding U.S. Appl. No. 13/474,332, 26 pages.

Notice of Allowance, dated Jun. 7, 2016, regarding U.S. Appl. No. 12/951,861, 43 pages.

Notice of Allowance, dated Jul. 20, 2016, regarding U.S. Appl. No. 14/479,319, 13 pages.

\* cited by examiner

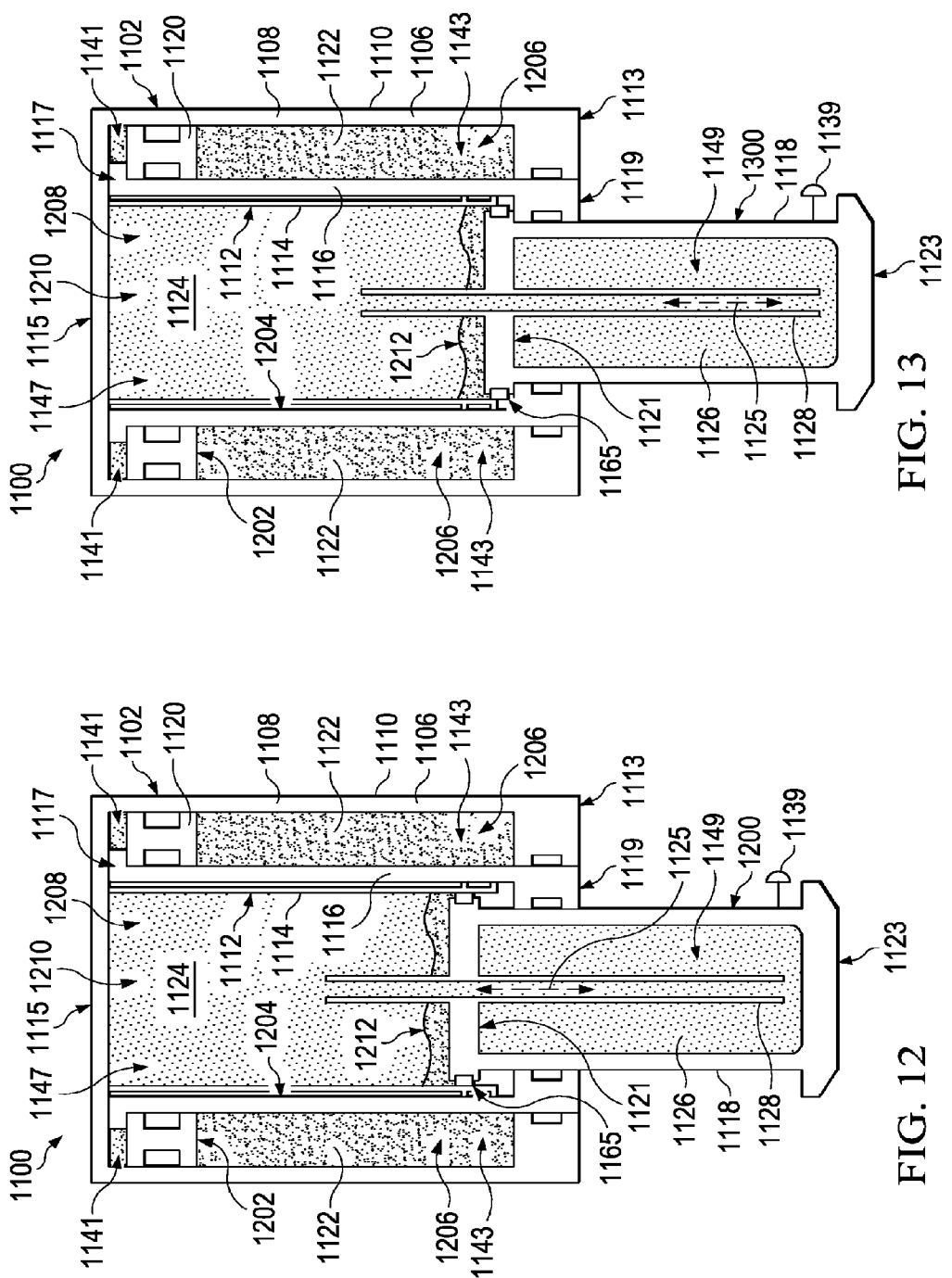

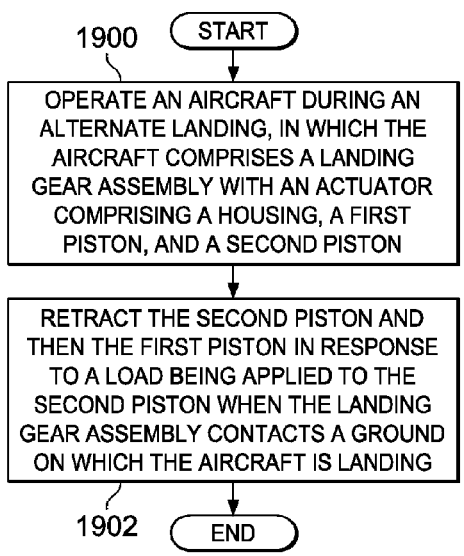
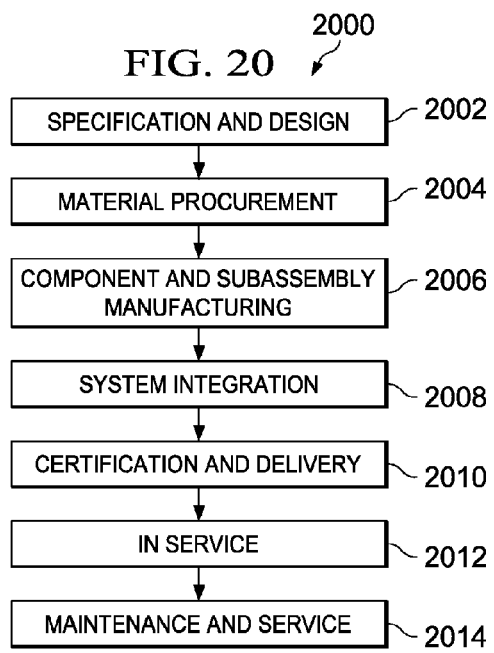
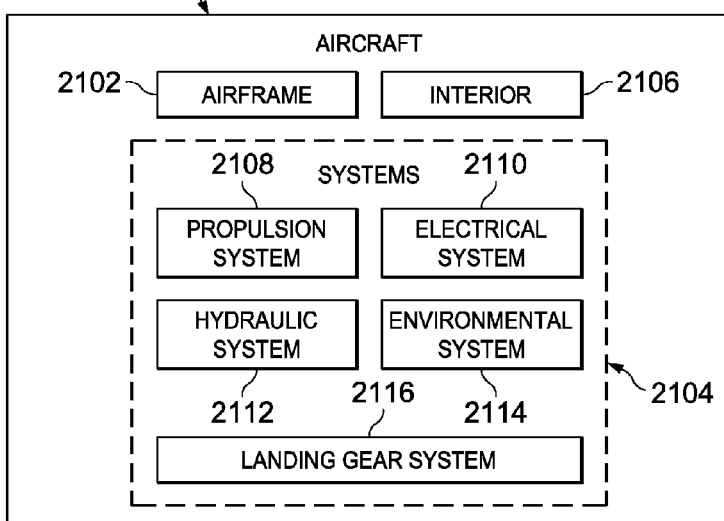

HYDRAULIC STRUT ASSEMBLY FOR SEMI-LEVERED LANDING GEAR

CROSS-REFERENCE TO RELATED APPLICATION

This application is a continuation application of U.S. patent application Ser. No. 13/474,332, filed May 17, 2012; which is a continuation-in-part application of U.S. patent application Ser. No. 12/951,861, filed Nov. 22, 2010.

BACKGROUND INFORMATION

1. Field

Embodiments of the present disclosure relate generally to landing gear and, more particularly, to a semi-levered landing gear and an associated method of positioning the bogie beam of the landing gear using a telescopic hydraulic actuator.

2. Background

Many airplanes include landing gear to facilitate takeoff, landing and taxi. The landing gear of some aircraft includes a shock absorber that is pivotally attached to a bogie beam at a distal or lower end thereof. The shock absorber may also be referred to as a shock strut. The bogie beam includes two or more axles upon which tires are mounted. In this regard, the bogie beam may include a forward axle positioned forward of the shock absorber and an aft axle positioned aft of the shock absorber. Upon takeoff, an airplane having a conventional landing gear with forward and aft axles will pivot about the pin that attaches the bogie beam to the shock absorber such that all of the landing gear tires have an equal load distribution.

In order to provide additional ground clearance for rotation of the aircraft during takeoff, semi-levered landing gear mechanisms have been developed. A semi-levered landing gear fixedly positions the shock absorber and the forward end of the bogie beam during takeoff such that the forward axle is in a raised position relative to the aft axle when the airplane has left the ground. As such, the aircraft pivots about the aft axle, rather than the pin that pivotally connects the bogie beam to the shock absorber, provided that the extend pressure of the shock absorber has been increased sufficiently. By rotating about the aft axle, the landing gear height is effectively increased so as to provide additional ground clearance for rotation of the aircraft during takeoff. As a result, the takeoff field length (TOFL) of the aircraft may be reduced, the thrust used by the engines may be reduced, or the weight carried by the aircraft may be increased while maintaining the same takeoff field length.

In order to provide for rotation of the aircraft about the aft axle during takeoff, a semi-levered landing gear locks the bogie beam in a "toes-up" attitude such that the tires mounted upon the aft axle support the aircraft, while the tires mounted upon the forward axle are raised above the surface of the runway. Following takeoff, the landing gear is generally stowed in a location such as a wheel well. In order to fit within a conventional wheel well, the landing gear is typically unlocked and the bogie beam repositioned in a "stowed" attitude prior to retracting the landing gear into the wheel well. Thereafter, during landing, the landing gear is lowered and the bogie beam is repositioned such that the forward axle is higher than the aft axle. Upon touch down, all of the wheels, including both those on the forward axle and the aft axle, equally bear the weight of the aircraft. Typically, the locking and unlocking of a semi-levered gear system, and the resulting repositioning of the bogie beam relative to the shock absorber, occurs without input from the pilot or the flight control system.

One type of semi-levered landing gear utilizes a mechanical linkage to lock the bogie beam during takeoff, but uses a separate mechanical linkage, termed a shrink-link, to reposition the shock absorber for retraction into the wheel well. The use of a shrink-link increases the complexity, expense and weight of the resulting semi-levered landing gear more than desired. Mechanical linkages also may not provide sufficiently desired damping during landing or bogie beam pitch dampening while on the ground.

Another type of semi-levered landing gear includes a locking hydraulic strut to lock the bogie beam in the desired orientation for takeoff. The locking hydraulic strut is essentially a locking actuator, but has a number of additional chambers and an internal floating piston. While a semi-levered landing gear having a locking hydraulic strut is suitable for some aircraft, the landing gear of other aircraft may not have sufficient clearance or room for the hydraulic strut to be positioned between the shock absorber and the bogie beam in an efficient manner.

Accordingly, it would be desirable to provide an improved semi-levered landing gear hydraulic actuator that may be used on landing gears that do not have sufficient space for housing a conventional locking hydraulic strut configuration. In particular, it would be desirable to provide a semi-levered landing gear that is both weight and cost efficient and that is not overly complex, while still satisfying the various operational requirements of the semi-levered landing gear.

SUMMARY

In one illustrative embodiment, a hydraulic strut assembly comprises a housing, a first piston, a second piston, and a third piston. The housing comprises an outer cylindrical structure and an inner cylindrical structure. The first piston is positioned between the outer cylindrical structure and the inner cylindrical structure. An outer chamber is configured to receive a first fluid is formed between the outer cylindrical structure, the inner cylindrical structure, and the first piston. The second piston is nested within the first piston. The inner cylindrical structure, the first piston, and the second piston form an inner chamber in which a volume of the inner chamber changes when at least one of the first piston and the second piston move. The inner chamber is configured to hold a second fluid comprising a gas. The third piston is positioned between the outer cylindrical structure and the first piston. The first piston, the second piston and the third piston are configured to move in a direction parallel to an axis through the housing.

In another illustrative embodiment, an actuator for use in a hydraulic strut assembly comprises a housing, a first piston, a second piston, and a third piston. The housing comprises an outer cylindrical structure and an inner cylindrical structure. The first piston is positioned between the outer cylindrical structure and the inner cylindrical structure. The outer chamber is configured to receive a first fluid that is formed between the outer cylindrical structure, the inner cylindrical structure, and the first piston in which the first fluid comprises a hydraulic liquid. The second piston is nested within the first piston. The inner cylindrical structure, the first piston, and the second piston form an inner chamber in which a volume of the inner chamber changes when at least one of the first piston and the second piston move. The inner chamber is configured to hold a second fluid comprising the hydraulic liquid and a gas. The third piston is positioned between the outer cylindrical structure and the first piston. The first piston, the second piston and the third piston are configured to move in a direction parallel to an axis through the housing.

In yet another illustrative embodiment, a method for operating an aircraft to perform an alternate landing is present. The aircraft is operated to perform the alternate landing. An actuator in a landing gear assembly for the aircraft comprises a housing, a first piston, a second piston, and a third piston. The housing comprises an outer cylindrical structure and an inner cylindrical structure. The first piston is positioned between the outer cylindrical structure and the inner cylindrical structure. An outer chamber is configured to receive a first fluid that is formed between the outer cylindrical structure, the inner cylindrical structure, and the first piston. The second piston is nested within the first piston. The inner cylindrical structure, the first piston, and the second piston form an inner chamber in which a volume of the inner chamber changes when at least one of the first piston and the second piston move. The inner chamber is configured to hold a second fluid comprising a gas. The third piston is positioned between the outer cylindrical structure and the first piston. The first piston, the second piston and the third piston are configured to move in a direction parallel to an axis through the housing. The second piston and the first piston are retracted in response to a load being applied to the second piston when the landing gear assembly contacts a ground on which the aircraft is landing. The gas in the inner chamber compresses when the second piston retracts.

The features and functions can be achieved independently in various illustrative embodiments of the present disclosure or may be combined in yet other illustrative embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 12 is an illustration of an actuator in a compressed position in accordance with an illustrative embodiment;

FIG. 13 is an illustration of an actuator in a retracted position in accordance with an illustrative embodiment;

FIG. 19 is an illustration of a process for operating a vehicle during an alternate landing in the form of a flowchart in accordance with an illustrative embodiment;

FIG. 20 is an illustration of an aircraft manufacturing and service method in accordance with an illustrative embodiment; and FIG. 21 is an illustration of an aircraft in accordance with an illustrative embodiment.

DETAILED DESCRIPTION

The present disclosure now will be described more fully hereinafter with reference to the accompanying drawings, in which preferred illustrative embodiments of the disclosure are shown. This disclosure may, however, be embodied in many different forms and should not be construed as limited to the illustrative embodiments set forth herein; rather, these illustrative embodiments are provided so that this disclosure will be thorough and complete, and will fully convey the scope of the disclosure to those skilled in the art. Like numbers refer to like elements throughout.

The illustrative embodiments recognize these issues and present a solution that is flexible, durable, relatively inexpensive compared to other struts, and lightweight. Additionally, the illustrative embodiments have added further value to aircraft operation in that the illustrative embodiments aid an aircraft in both landing and lift off. The illustrative embodiments aid an aircraft to lift off by increasing the angle of attack of the aircraft. The angle of attack is the angle at which an aircraft is attempting to lift off from the ground into the air. The illustrative embodiments aid an aircraft to land by providing additional bogie beam pitch dampening. Other illustrative embodiments are apparent from the following additional description.

Specifically, illustrative embodiments of the present disclosure relate generally to landing gear assemblies and, more particularly, to a semi-levered landing gear assembly and an associated method of positioning the bogie beam of the landing gear assembly using a telescopic actuator. However, the illustrative embodiments may also apply to other vehicles and may be used in other applications aside from vehicles. Thus, the illustrative embodiments are not limited to use in landing gears or landing gear assemblies.

Figure 1:
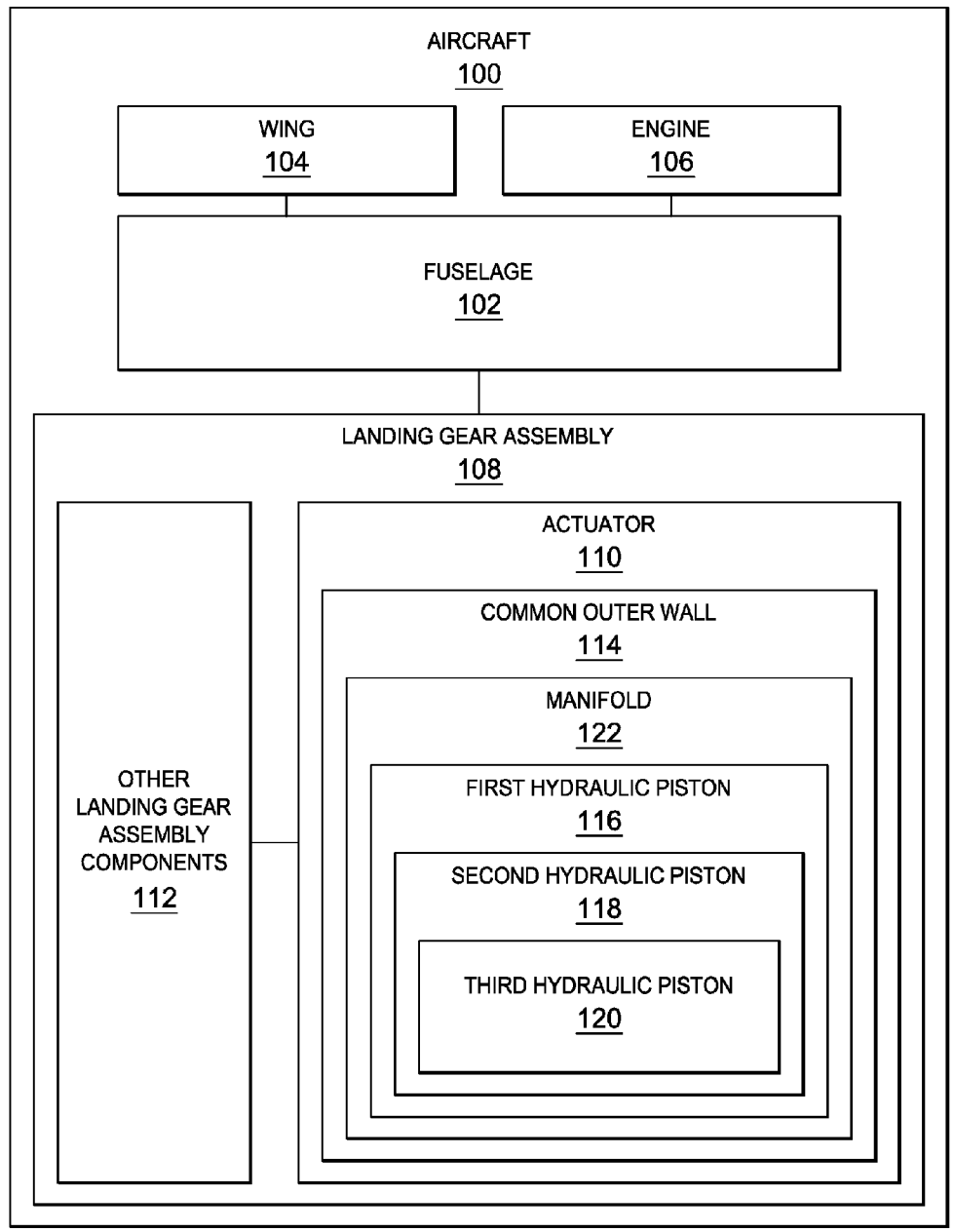
FIG. 1 is an illustration of an aircraft in the form of a block diagram in accordance with an illustrative embodiment.

FIG. 1 is an illustration of a block diagram of an aircraft in which an illustrative embodiment may be implemented. While FIG. 1 may be used to describe an aircraft incorporating the illustrative embodiments, aircraft 100 may also potentially be any other vehicle in which a hydraulic strut or hydraulic piston might be used.

Aircraft 100 includes fuselage 102, which is connected to wing 104. In a non-limiting illustrative embodiment, aircraft 100 may include engine 106. In another illustrative embodiment, landing gear assembly 108 may be connected to one of wing 104 or fuselage 102, or even possibly engine 106, or possibly combinations thereof. Aircraft 100 may include many other components. In an illustrative embodiment, landing gear assembly 108 may include actuator 110 and other landing gear assembly components 112.

Actuator 110 may include a nested series of hydraulic pistons sharing common outer wall 114. Thus, for example, actuator 110 may include first hydraulic piston 116, second hydraulic piston 118, and third hydraulic piston 120. In an illustrative embodiment, the three hydraulic pistons are concentric. In an illustrative embodiment, the three hydraulic pistons may actuate in a telescopic manner such that, when fully extended, second hydraulic piston 118 extends past a top of the third hydraulic piston 120, and second hydraulic piston 118 extends past a top of first hydraulic piston 116. Actuator 110 also includes manifold 122. Manifold 122 may be contained within common outer wall 114; however, manifold 122 may be connected in some other way to the first, second, and third hydraulic pistons. In any case, manifold 122 is disposed relative to the first, second, and third hydraulic pistons (116, 118, and 120) such that a fluid moving in manifold 122 can control positions of the first, second, and third hydraulic pistons (116, 118, and 120). Examples of such a fluid flow are detailed below with respect to FIGS. 2 through 5.

Other arrangements are also possible. In other illustrative embodiments, one or more of the hydraulic pistons might be replaced by some other kind of piston, such as an electromechanical piston.

In an illustrative embodiment, at least two of the first, second, and third hydraulic pistons may share a common fluid source. In other illustrative embodiments, all three hydraulic pistons share a common fluid source. In an illustrative embodiment, more or fewer hydraulic pistons may be present. Thus, for example, four or more nested hydraulic pistons might be provided, though in another illustrative embodiment only two nested hydraulic pistons might be provided.

In an illustrative embodiment, the different hydraulic pistons might have different operating pressures. Thus, for example, third hydraulic piston 120 might maintain a constant pressure having a first value, whereas the second hydraulic piston 118 might maintain a constant return pressure having a second value different than or the same as the first value. However, pressures may vary; for example, the first hydraulic piston 116 might be configured to operate at variable pressures between third and fourth values different than the first and second values. Other combinations of operating pressures are possible.

The illustration of aircraft 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
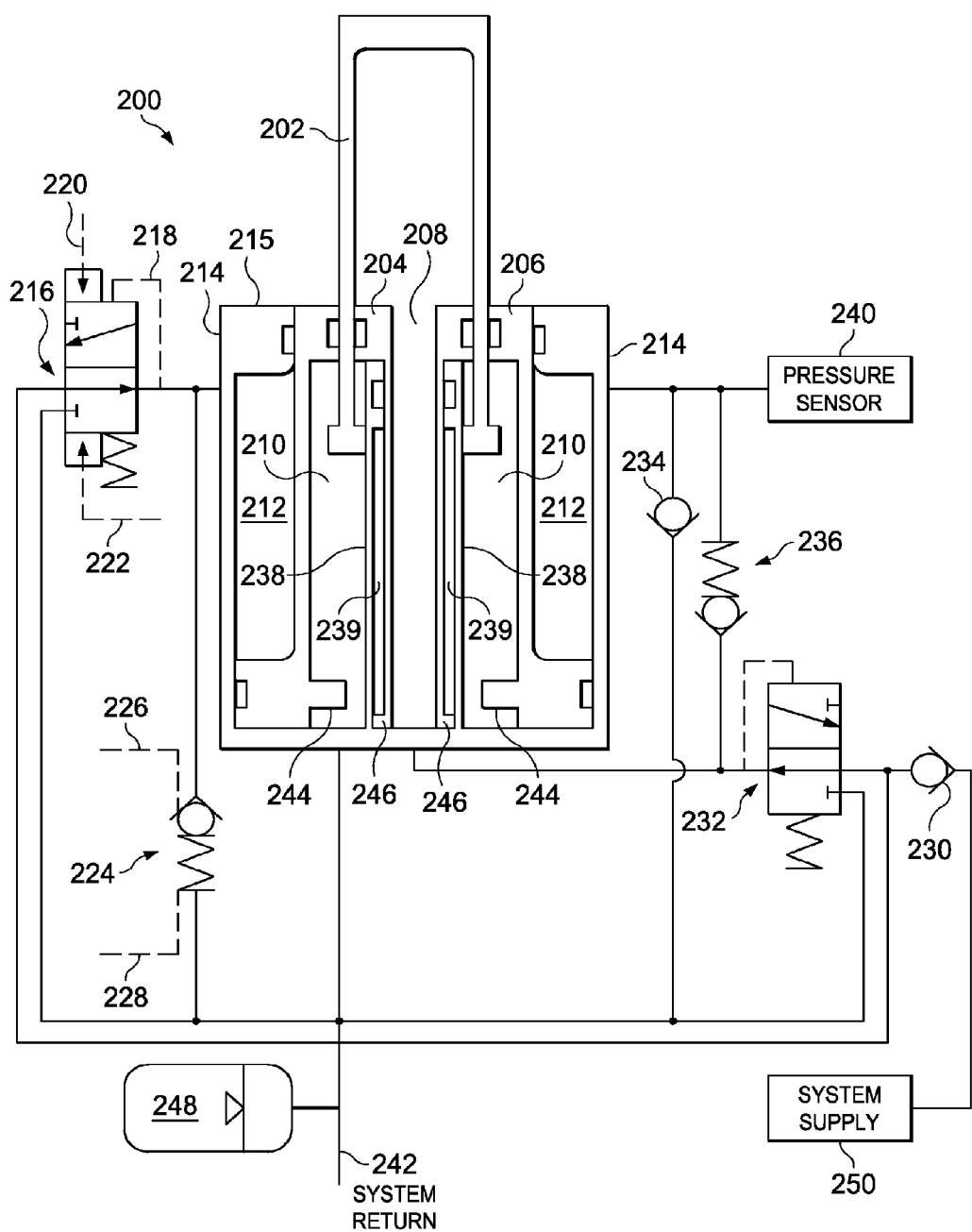
FIG. 2 is an illustration of a hydraulic actuator in accordance with an illustrative embodiment.

FIG. 2 is an illustration of a hydraulic actuator, in accordance with an illustrative embodiment. Hydraulic actuator assembly 200 shown in FIG. 2 may be actuator 110 shown in FIG. 1. Likewise, other components may correspond between FIG. 1 and FIG. 2.

For example, first piston 206 may correspond to first hydraulic piston 116, second piston 202 may correspond to second hydraulic piston 118, third piston 204 may correspond to third hydraulic piston 120, and common outer wall 214 may correspond to common outer wall 114. Hydraulic actuator assembly 200 may also be referred to as a telescopic hydraulic strut assembly in some illustrative examples.

In the illustrative embodiment shown in FIG. 2, first piston 206, second piston 202, and third piston 204 are concentric to each other. Each hydraulic piston has a corresponding pressure chamber. Thus, for example, second piston 202 and third piston 204 share chamber 208, and first piston 206 has chamber 210. The space between common outer wall 214 and first piston 206 define chamber 212. These chambers may operate at the same or different pressures, variable pressures, or a combination of constant and variable pressures, all of which may be the same or different.

Figure 8:
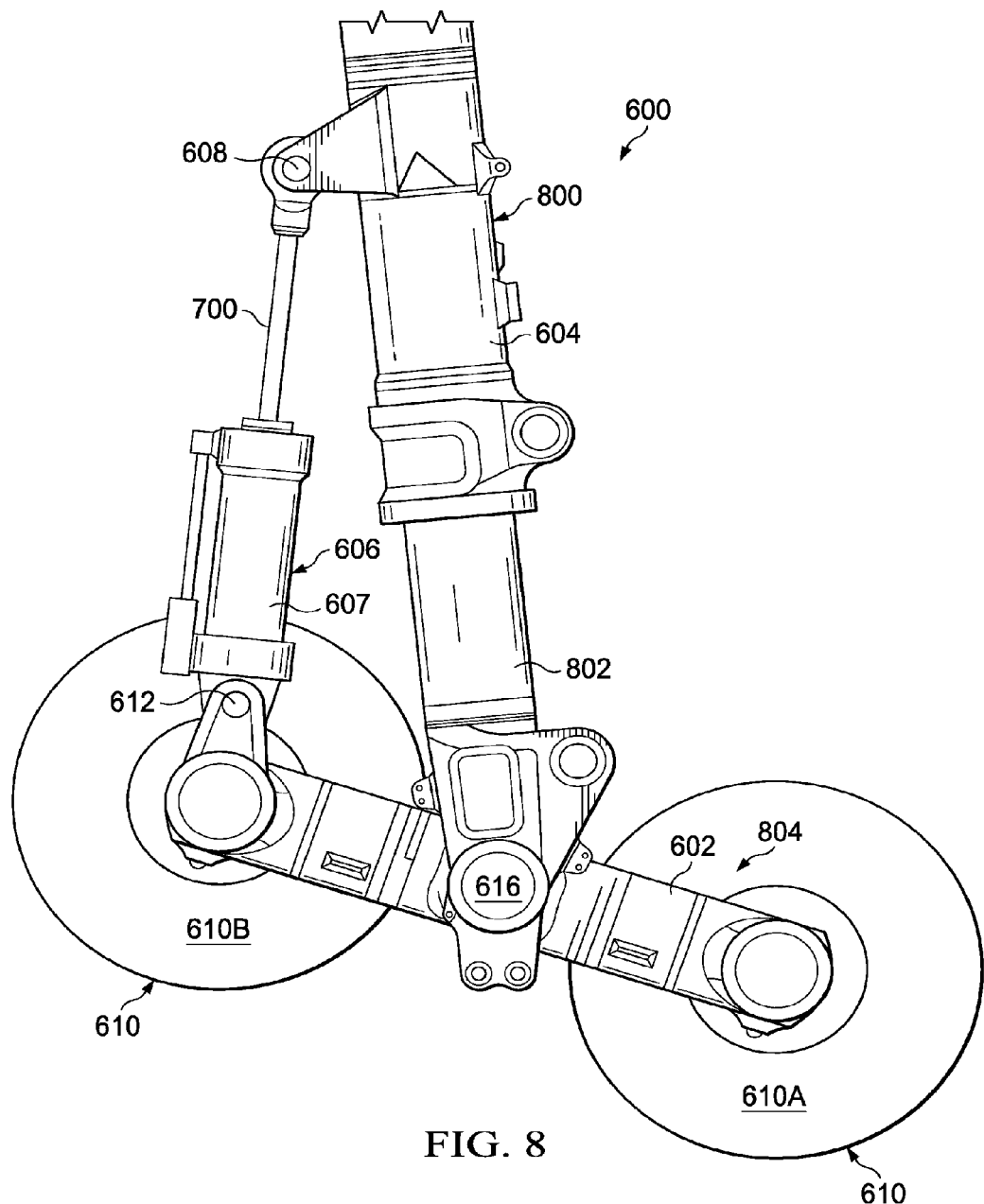
FIG. 8 is an illustration of a landing gear assembly in a landing position in accordance with an illustrative embodiment.

In a non-limiting illustrative embodiment, the purpose of hydraulic actuator assembly 200 is to act as a fixed length tension member during takeoff, as shown in FIG. 8. In this configuration, hydraulic actuator assembly 200 may be referred to as a hydraulic strut. During takeoff roll, the load on the landing gear assembly is reduced as the wings generate lift. The reduced load on the landing gear shock absorber 604 may cause the lower portion 802 of the shock absorber 604 to extend such that the bogie beam 602 is forced to pivot about upper lug pivot 612 rather than about the main pivot 616 so as to provide a semi-levered function to the landing gear assembly 600. As a result, the aircraft may experience a greater ground clearance, which in turn allows the airplane to rotate to a greater angle of attack on takeoff.

Figure 3:
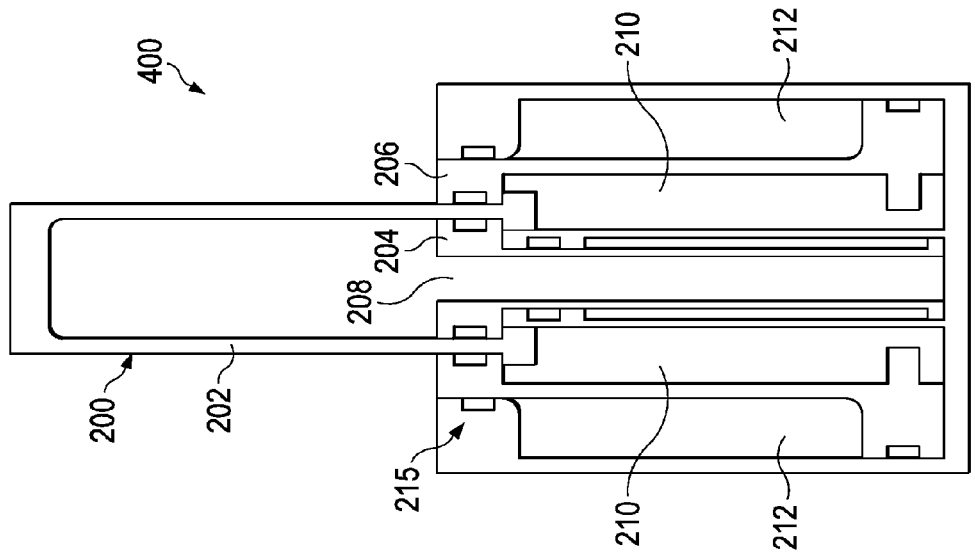
FIG. 3 is an illustration of a hydraulic actuator in a static position for an on-ground condition, in accordance with an illustrative embodiment.
Figure 4:
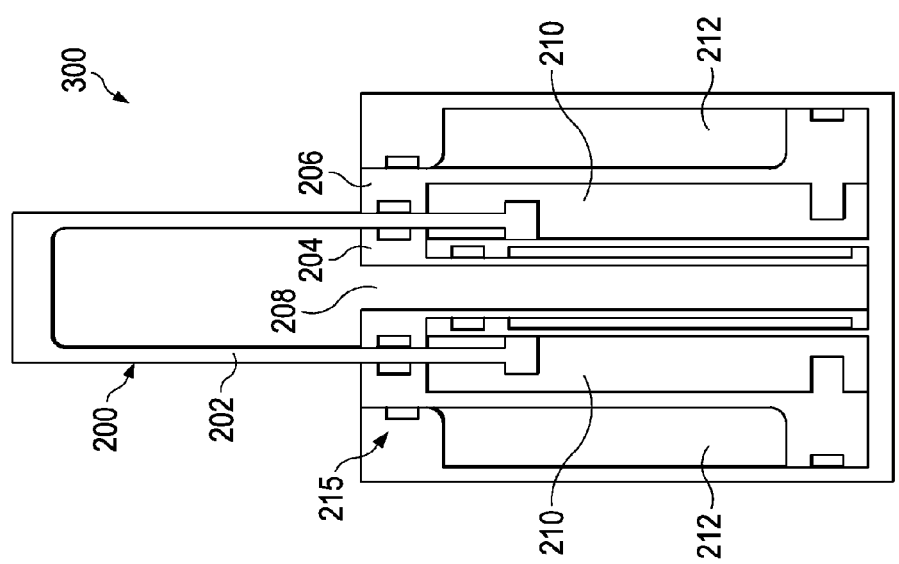
FIG. 4 is an illustration of a hydraulic actuator in a lock-up position in accordance with an illustrative embodiment.

In a non-limiting illustrative embodiment, to perform the semi-levered function of a hydraulic actuator, chamber 212 is filled with fluid to an illustrative pressure greater than the fluid pressure in chamber 210. This result is shown in FIGS. 3 and 4. The greater fluid pressure in chamber 212 causes the first piston 206 to be fully retracted inside the cylinder barrel 215. FIG. 3 shows the on-ground configuration where the first piston 206 is fully retracted, but the second piston 202 and the third piston 204 may move, allowing fluid to pass in and out of chambers 210 and 208. This movement of fluid in and out of chambers 210 and 208 provides dampening, which is an illustrative function to resist bogie beam pitch about main pivot 616 of FIGS. 6 through 8.

During takeoff roll, the load on the landing gear assembly is reduced as the wings generate lift. The reduced load on the landing gear shock absorber causes the lower portion of the shock absorber 604 to extend. The extending motion of the shock absorber causes the hydraulic actuator assembly 200 to extend to the position shown in FIG. 4. In this position, the second piston 202 is pulled against stops on the end of first piston 206. This position achieves the semi-lever functionality of the hydraulic actuator and landing gear assembly.

Referring to FIG. 3 in conjunction with the above description of FIG. 2, in this illustrative embodiment, the hydraulic actuator assembly 200 passively transitions from position 300 to position 400 in response to the loads applied to the aircraft and landing gear assembly. This transition may not require any input from the pilots, crew, or any other mechanical or electrical device to achieve this desirable functionality. This passive operation reduces mechanical and hydraulic complexity and increases reliability.

Figure 5:
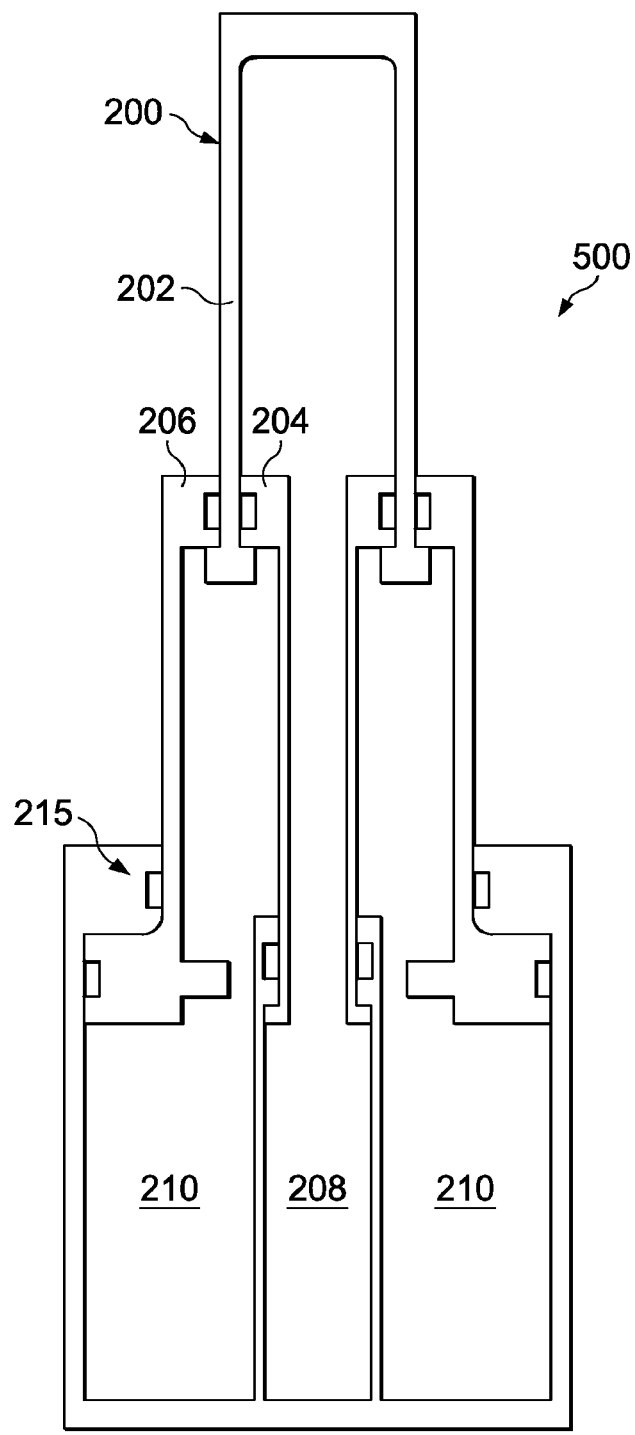
FIG. 5 is an illustration of a hydraulic actuator in a fully extended position for stowing in accordance with an illustrative embodiment.

Hydraulic actuator assembly 200 may have other functions. For example, hydraulic actuator assembly 200 may aid in positioning the bogie beam 602 of FIGS. 6 through 8, to different positions of varying lengths, such as stow or landing positions. In typical large aircraft configurations, it is beneficial to position the bogie beam 602 of FIG. 7 in an attitude where the forward axle is lower than the aft axle for storage in a wheel well. In this instance, the hydraulic actuator assembly 200 can be lengthened to position 500 as shown in FIG. 5. This position is achieved by decreasing the fluid pressure in chamber 212, which allows the pressure in chamber 208 to extend the hydraulic actuator assembly 200. In this manner, passages in the manifold allow the fluid in chamber 212 to exit the chamber. In some instances it may be beneficial to integrate the command to assume position 500 with the landing gear assembly retraction command such that the hydraulic actuator commands position 500 automatically when the pilot commands the landing gear assembly to be retracted.

Hydraulic actuator assembly 200 may allow for extension during landing touchdown to allow a change in bogie beam pitch to facilitate air-ground sensing. In particular, hydraulic actuator assembly 200 may allow for extension during landing touchdown to allow a change in bogie beam pitch to provide even tire loading. Hydraulic actuator assembly 200 may provide damping during landing to limit loads into the other parts of the aircraft. Hydraulic actuator assembly 200 may provide bogie beam pitch damping, as shown further in FIG. 6.

Returning to FIG. 2, the second piston 202 may operate with a constant pressure, such as about 2000 pounds per square inch (psi) in one non-limiting illustrative embodiment (possibly more or fewer psi) by pressuring the fluid in chamber 208 accordingly. The constant pressure may be selected to provide sufficient force to position a bogie beam to stow, while not producing excessive force while on the ground, which could undesirably load the tires.

In an illustrative embodiment, the third piston 204 may maintain a constant downward force due to pressure in chamber 208 being greater than chamber 210. This force may reduce the extend forces and reduce the areas that experience system pressure.

In an illustrative embodiment, the first piston 206 may operate at variable pressures by varying the pressure of the fluid in chamber 212. The pressure in chamber 212 may be varied depending on the mode of operation of the hydraulic actuator assembly 200. For example, a relatively low pressure of about 500 psi may be used in chamber 212 for landing to allow the bogie beam to move for air-ground sensing, though higher or lower pressure might be used for this purpose depending on the aircraft and design considerations. On the other hand, chamber 212 may operate at about 3000 to about 5000 psi, or greater, in order to lock the hydraulic actuator assembly 200. In this case, the hydraulic actuator assembly 200 may act as a tension member during lift off rotation of the aircraft. Later, a reduced pressure of system return in chamber 212 may cause the strut to telescopically extend the nested hydraulic pistons 206, 204, and 202 while bringing the strut and bogie beam to a stow position.

In an illustrative embodiment, the second piston 202 may be referred to as a main piston, the first piston 206 may be referred to as a telescopic piston, and the third piston 204 may be referred to as a floating piston. In an illustrative embodiment, third piston 204 and guide tube 238 may define chamber 239, which is common with chamber 208 and which may greatly reduce the hydraulic flow used to reposition the hydraulic actuator assembly 200. As a result, the time used to extend the hydraulic actuator assembly 200 for stowing in the wheel well may be illustratively reduced since the flow into chamber 208 from system supply 250 is much less than if chamber 210 had to be filled using system supply 250.

Attention is now turned to pressure ranges with respect to hydraulic actuator assembly 200. In the illustrative embodiment shown, pressure ranges are for a system operating between about 500 psi and 5000 psi, though other ranges might be suitable and could vary by as much as about 0 psi to about 10,000 psi or more. These pressures are approximate and may vary with each specific operation or implementation. Seals are not shown, but conventional seals may be used in each groove shown in hydraulic actuator assembly 200.

In an illustrative embodiment, multi-mode reducer 216 may provide three outlet pressures using a single valve, as shown. These pressures might be 0 psi, 500 psi, and 5000 psi, as indicated at dashed sensing line 218. The single valve may provide three outlet pressures by using a standard pressure reducer and adding solenoid valve input 220 and solenoid valve input 222 to either end as shown. Solenoid valve input 220 and solenoid valve input 222 may be actuated to drive the valve to be fully on or fully off. When solenoid valve input 220 is on, then the pressure may be about 0 psi. When solenoid valve input 222 is on, then the pressure may be about 5000 psi. When both solenoid valve input 220 and solenoid valve input 222 are off, multi-mode reducer 216 may perform as a normal reducer, outputting about 500 psi in this example. The about 500 psi may be low enough to hold the bogie beam in a landing attitude but still allow the bogie beam to move at touchdown, allowing the aircraft to use initial bogie beam motion to trigger landing spoilers. In particular, pressure of about 500 psi may be low enough to hold the bogie beam in a landing attitude but still allow the bogie beam to move at touchdown, allowing the tires to be evenly loaded when the aircraft contacts the ground.

Multi-mode relief valve 224 may be an adaptation of a common relief valve with solenoid valve inputs, which may be the same valve inputs used in multi-mode reducer 216. Thus, for example, solenoid valve input 226 may cause the relief valve to be opened, for use in the stow position, and solenoid valve input 228 may be used to put the relief valve into its high pressure setting. The solenoid valve input 228 may increase the cracking pressure from about 1000 psi to about 5500 psi by increasing the spring pre-load. A use for the multi-mode relief valve 224 may be to provide touchdown damping in order to reduce loads in the fuselage and other parts of the airframe, which saves weight. During touchdown, the first piston 206 and the second piston 202 may be pulled out rapidly. Fluid from the rod end of chamber 212 may exit through the multi-mode relief valve 224, which may be sized to provide the proper damping rate.

A pressure sensor 240 may be used to verify that the hydraulic actuator assembly 200 is locked. If the pressure sensor senses that pressure is near maximum system pressure, then the hydraulic actuator assembly 200 may react to the full tension load expected during takeoff with a semi-levered landing gear. Note that if the seals are damaged, full pressure would not be achieved and/or sensed by pressure sensor 240, thereby providing an illustrative method of testing the integrity of the hydraulic actuator assembly 200.

Check valve 230 may be a check valve that may trap fluid in hydraulic actuator assembly 200 in order to hold the hydraulic actuator assembly 200 in the fully extended position. In an illustrative embodiment, the hydraulic pressure may be removed from system supply 250 after the landing gear is retracted, and check valve 230 also holds the bogie beam in position while the landing gear is tucked into the wheel well.

Reducer 232 may provide reduced pressure to the chamber 208. This reduced pressure may be selected so as to avoid overloading the front tires while the aircraft is on the ground, but being sufficient pressure to power the actuator to the fully extended position when gear up is selected. A possible alternative illustrative embodiment may be to provide a solenoid input to reducer 232 in order to shut reducer 232 off while the aircraft is on the ground. In this illustrative embodiment, the tires may be equally loaded.

Check valve 234 may be used in an alternate extension case, such as where the landing gear assembly is extended by alternate means after hydraulic system loss. This use may leave the hydraulic actuator assembly 200 fully extended so that the aircraft may land with front tires down. This landing procedure may cause a rapid compression of the hydraulic actuator assembly 200. The second piston 202 may move first, which may force fluid out of chamber 210 and back towards reducer 232. In this case, the fluid in chamber 208 may also flow to system return 242. In an illustrative embodiment, accumulator 248 may be provided for surge suppression.

In any case, relief valve 236 may allow the fluid in chamber 208 to flow into chamber 212, forcing the first piston 206 down. This action starts the first piston 206 moving before the second piston 202 reaches the first piston 206, which reduces impact loads. If the fluid flow from chamber 210 exceeds the return line capacity, then that flow may flow through the check valve 234 to chamber 212, further aiding the motion of the first piston 206. When the second piston 202 reaches the first piston 206, the second piston 202 may contact stop 244.

In an illustrative embodiment, the third piston 204 may be contained within the second piston 202, in which case, guide tube 238 may extend from the head end of cylinder barrel 215. In this case, the third piston 204 may have a stop 246 that prevents the third piston 204 from departing from guide tube 238 if the third piston 204 attempts to over-extend.

Figure 6:
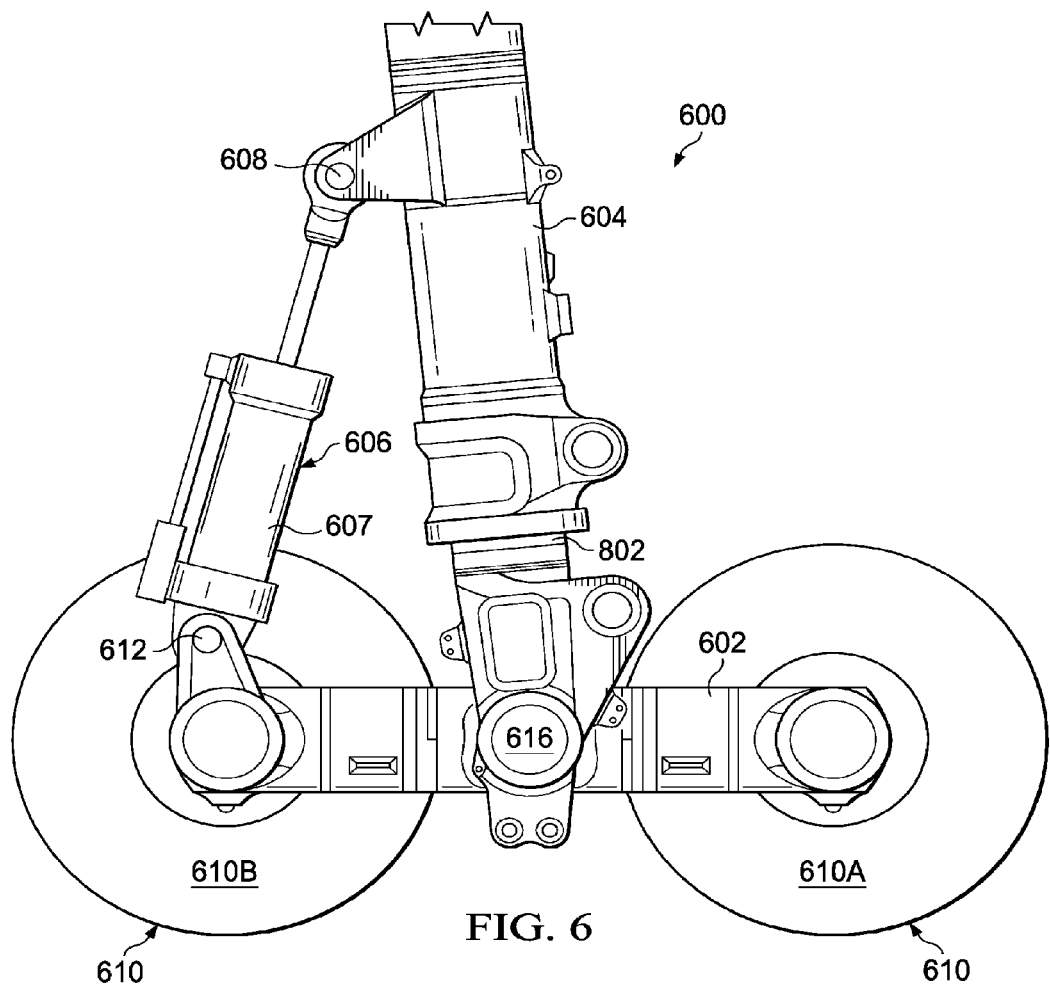
FIG. 6 is an illustration of a landing gear assembly in a static position in accordance with an illustrative embodiment.
Figure 7:
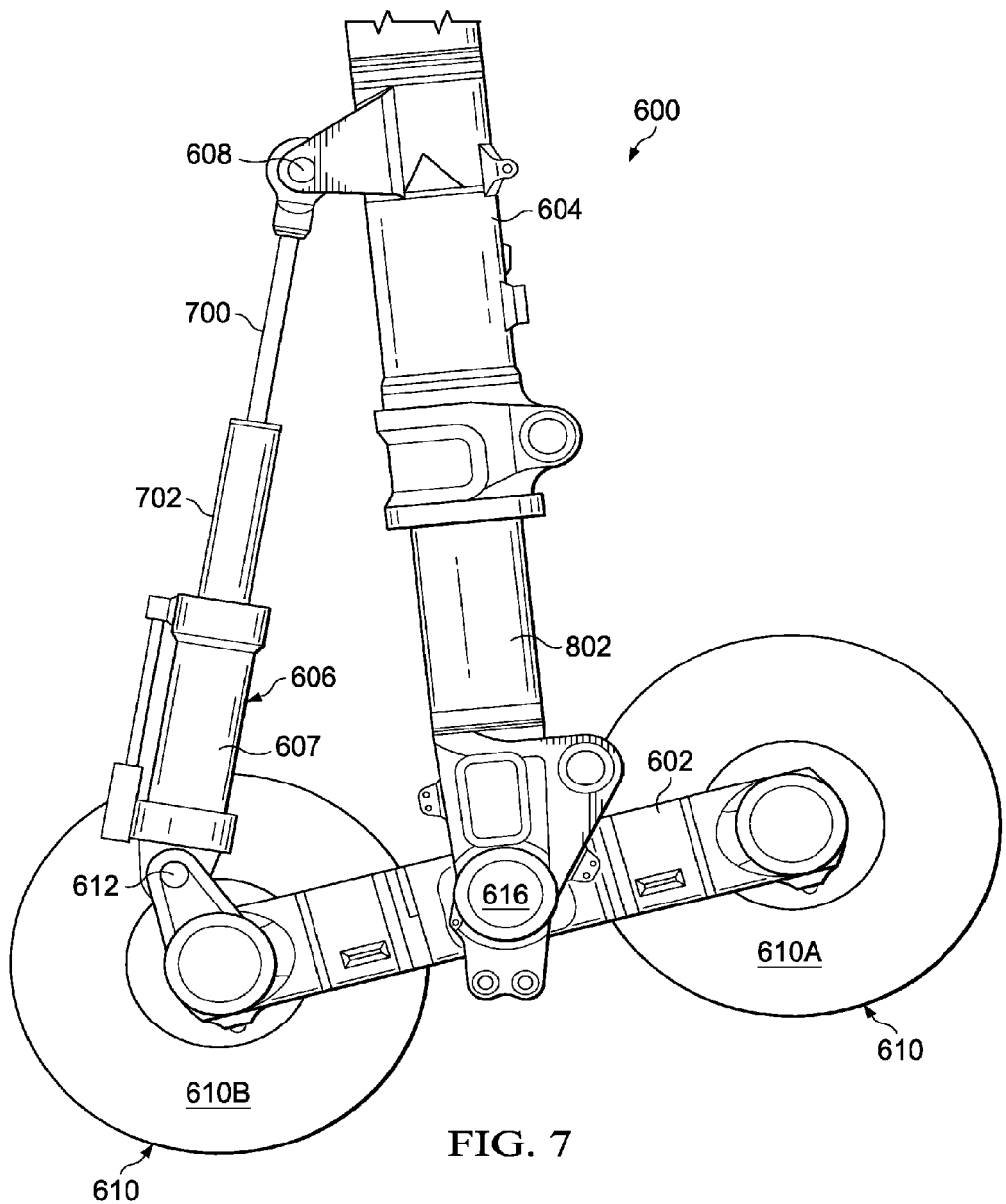
FIG. 7 is an illustration of a landing gear assembly in a stow position in accordance with an illustrative embodiment.

Thus, FIG. 2 depicts one illustrative embodiment of hydraulic strut 606 of FIGS. 6 through 8 in greater detail. Hydraulic actuator assembly 200 includes a cylinder barrel 215, a first piston 206 slidably received through an open end of the cylinder barrel 215, and second piston 202 slidably received through an open end of first piston 206. The second piston 202 may include at least one lug or other connecting member at its upper end for attachment to the landing gear assembly upper half, as shown in FIGS. 6 through 8. The cylinder barrel 215 may include at least one lug or other connecting member at its lower end for attachment to bogie beam 602 at upper lug pivot 612, both of FIGS. 6 through 8. The cylinder barrel 215 also contains a guide tube 238 that is fixed to the cylinder barrel 215. A floating piston, third piston 204, is contained within the second piston 202 and the guide tube 238. The upper end of cylinder barrel 215 sealingly engages with the outer surface of first piston 206. The lower end of the first piston 206 sealingly engages with the inner surface of the cylinder barrel 215.

The cylinder barrel 215 includes fluid passages as shown in FIG. 2 to supply chambers 212, 210, and 208 with pressurized fluid. These passages and chambers constitute a manifold contained within the common outer wall, the manifold is disposed relative to the first, second, and third hydraulic pistons such that a fluid moving in the manifold can control positions of the first, second, and third hydraulic pistons. The features of the hydraulic manifold shown in FIG. 2 allow the pressures in chamber 212 to be changed such that the first piston 206 may be forced in or out of the cylinder barrel 215 in a desirable manner. Note that the manifold may take other forms. For example, the manifold may be a series of possibly different (more or fewer than those shown) chambers connected in some other way to the first, second, and third hydraulic pistons. In any case, the manifold is disposed relative to the first, second, and third hydraulic pistons such that a fluid moving in the manifold can control positions of the first, second, and third hydraulic pistons.

The upper end inside surface of first piston 206 sealingly engages with the outer surface of the second piston 202. The inside surface of second piston 202 sealingly engages with the upper outside surface of third piston 204. The upper end inside surface of the guide tube 238 sealingly engages with the outer surface of the third piston 204. The cylinder barrel 215 includes fluid passages as shown in FIG. 2 to supply chambers 208, 210, and 212 with pressurized fluid. The features of the hydraulic actuator assembly 200 shown in FIG. 2 allow the pressures in chambers 208 and 212 to be changed such that the second piston may be forced out of the first piston 206 in a desirable manner and both second piston 202 and third piston 204 can be extended together.

As implied above, the nested pistons shown in hydraulic actuator assembly 200 may have different arrangements to achieve different functions. Furthermore, different valves, reducers, and other hydraulic components may be arranged to change how hydraulic fluids flow within the various fluid chambers of hydraulic actuator assembly 200, again to achieve different functions. Thus, the illustrative embodiments are not limited by the particular arrangements described with respect to FIG. 2.

FIG. 3 through FIG. 5 are illustrations of a hydraulic actuator in use, in accordance with an illustrative embodiment. The illustrative embodiments shown in FIG. 3 through FIG. 5 correspond to the hydraulic actuator assembly 200 shown in FIG. 2. Therefore, reference numerals in FIG. 3 through FIG. 5 sharing the same value as the reference numerals in FIG. 2 may correspond to the same components and may have similar structure and functions. Not all components described with respect to FIG. 2 are necessarily shown with respect to FIGS. 3 through 5; however, all such components may be present in some illustrative embodiments.

The illustrative embodiments shown in FIG. 3 through FIG. 5 show hydraulic actuator assembly 200 in use. In FIG. 3, the hydraulic actuator assembly 200 has a position 300 for use while the aircraft is on the ground. In FIG. 4, the hydraulic actuator assembly 200 has a position 400. In FIG. 5, the hydraulic actuator assembly 200 has a position 500.

In the illustrative embodiment shown in position 300, the chamber 208 may have a pressure of about 2000 psi, but that value may be more or less. The chamber 210 is at the return pressure, which may be a constant pressure of about 50 psi.

The chamber 212 may have a pressure of about 500 psi. In this arrangement, third piston 204 and first piston 206 are held down by pressure in chambers 208 and 212. Second piston 202 slides axially as the bogie beam moves.

This position 300 of hydraulic actuator assembly 200 may be beneficial when the airplane is on the ground. The position may be beneficial because the hydraulic actuator assembly 200 allows for normal bogie beam pitch motion without excessive loads in the hydraulic actuator. Furthermore, the hydraulic actuator may be arranged so as to avoid impact against a lockup position to avoid overloading the front tires. Additionally, the hydraulic actuator may be short enough to prevent overload of the hydraulic actuator in the event of an unexpected condition such as one or more tires on the aft landing gear axles experiencing lowered air pressure.

In position 400, the pressure in chamber 208 and chamber 210 is maintained, but the pressure in chamber 212 may be increased so as to restrain first piston 206 in a fully compressed position. Position 400 is illustrative during takeoff. Position 400 is beneficial on takeoff because hydraulic actuator assembly 200 has a fixed length, which has the effect of pulling up on the front of the bogie beam as the landing gear shock absorber pushes down, which causes the rear tires to be forced down. As a result, the effective length of the landing gear assembly is longer at the point of rotation, which allows the airplane to rotate to a higher angle of attack.

During landing, position 400 causes hydraulic actuator assembly 200 to see an initial tension load. In this manner, position 400 may act as a damper during initial touchdown as fluid is forced out of chamber 212.

In position 500, the pressure in chamber 212 is removed so that the pressure in chamber 208 will fully extend second piston 202. The extension of second piston 202 will pull third piston 204 to its full extended position. As a result, hydraulic actuator assembly 200 reaches maximum telescopic extension of each of the three hydraulic pistons such that the top of second piston 202 extends past the top of third piston 204. Position 500 is illustrative because this position orients the bogie beam in the desirable attitude to fit inside the wheel well. No supply pressure is present and no single issue or change in the hydraulic actuator assembly configuration can cause large retraction forces.

FIGS. 6 through 8 illustrate a landing gear assembly in three different positions in several illustrative embodiments. FIG. 6 illustrates a landing gear assembly 600 in the ground position; FIG. 7 illustrates landing gear assembly 600 in the stow position; and FIG. 8 illustrates landing gear assembly 600 in a landing position. Reference numerals in FIGS. 6 through 8 sharing the same value as the reference numerals may correspond to similar components and may have similar structure and functions. In one possible non-limiting illustrative embodiment, the same components among FIGS. 6 through 8 may be the same and have the same functions. The illustrative embodiments shown in FIGS. 6 through 8 are non-limiting examples of one possible use of hydraulic actuator assembly 200 shown in FIGS. 2 through 5. A possible operation of landing gear assembly 600 in conjunction with hydraulic strut 606 is described with respect to FIGS. 2 through 5.

Turning first to FIG. 7, an illustration of a landing gear assembly in the stow position is shown, in accordance with an illustrative embodiment. Landing gear assembly 600 includes hydraulic strut 606. Hydraulic strut 606 may be the same or similar to hydraulic actuator assembly 200 shown in FIG. 2 through FIG. 5. The illustrative embodiment shown in FIG. 7 is a non-limiting example of one possible use of hydraulic actuator assembly 200 shown in FIGS. 2 through 5. A possible operation of landing gear assembly 600 in conjunction with hydraulic strut 606 is described with respect to FIGS. 2 through 5.

Turning now to FIG. 6, hydraulic strut 606 is shown in the ground configuration, which may correspond to position 300 shown in FIG. 3. Landing gear assembly 600 also shows other features, some of which are described above with respect to FIGS. 2 through 5. These features include bogie beam 602 attached to the lower portion of shock absorber 604. Lug 608 is attached to the cylinder portion of shock absorber 604. Plurality of wheels 610 are attached to bogie beam 602. Plurality of wheels 610 may include forward wheels 610B and aft wheels 610A. Hydraulic strut 606 is pivotally attached to the upper portion of shock absorber 604 at lug 608. Hydraulic strut 606 is pivotally attached to bogie beam 602 at lower lug pivot 612. Shock absorber 604 is attached to bogie beam 602 by main pivot 616. In use, lug 608 and lower lug pivot 612 allow hydraulic strut 606 to move in two different orientations with respect to shock absorber 604 and bogie beam 602. In use, main pivot 616 allows the ends of bogie beam 602 to pivot upwardly and downwardly with respect to shock absorber 604.

FIG. 7 also depicts the hydraulic strut 606 with the second piston 700 (corresponding to second piston 202 of FIG. 2) pivotally attached to the upper portion of the shock absorber 604 via lug 608. The cylinder barrel 607 (corresponding to cylinder barrel 215 of FIG. 2) of hydraulic strut 606 is pivotally attached to the bogie beam at the lower lug pivot 612. In other illustrative embodiments, the hydraulic strut 606 may be reoriented such that the second piston (700/202) may be attached to the lower lug pivot 612 to the bogie beam 602 and the cylinder barrel (215/607) may be attached to the cylinder portion of the shock absorber 604.

As shown in FIG. 7, hydraulic strut 606 is actuated such that second piston (700/202) and telescopic, first piston (702/206) are extended. In an embodiment, both are fully extended. In this orientation, one end of bogie beam 602 is forced downwardly about main pivot 616. This orientation and operation is described further with respect to FIGS. 2 through 5.

After liftoff, the hydraulic strut 606 positions the landing gear assembly 600 at an angle, such that the forward axle is lower than the aft axle, as shown in FIG. 7. In an illustrative embodiment, the angle may be twelve degrees, though this value may be varied between less than a degree to eighty degrees or more. Hydraulic strut 606 may be repositioned quickly to stow position shown in FIG. 7 using the small flow required to fill chamber 208 of FIG. 2.

Later, the hydraulic strut 606 may be hydraulically de-energized. While in the wheel well, the hydraulic strut 606 may maintain the fully extended position with no supply pressure. The return pressure in chamber 210 may aid in this function. While in this position, no single failure may cause large retraction forces.

Turning now to FIG. 8, the hydraulic strut 606 is depicted with the second piston 700 (corresponding to second piston 202 of FIG. 2) pivotally attached to the upper portion of the shock absorber 604 via lug 608. The cylinder barrel 607 (corresponding to cylinder barrel 215 of FIG. 2) of hydraulic strut 606 is pivotally attached to the lower lug pivot 612 which is attached to the bogie beam. In other illustrative embodiments, the hydraulic strut 606 may be reoriented such that the second piston (700/202) may be attached to the lower lug pivot 612 to the bogie beam 602 and the cylinder barrel (215/607) may be attached to the cylinder portion of the shock absorber 604 at lug 608.

In an illustrative embodiment, the bogie beam angle with respect to the ground may be 23 degrees, though this value may be varied to suit the requirements of the vehicle. This orientation and operation is described further below, with respect to FIGS. 2 through 5.

Before landing, the hydraulic strut 606 positions the landing gear assembly from position 500 (FIG. 5) to position 400 (FIG. 4) by retracting the first piston 206. This position tilts the bogie beam 602 for a landing position such that the forward axle is higher than the aft axle. In this position, the hydraulic strut 606 is restrained with a prescribed amount of force by pressure in chamber 212 of FIG. 2.

During landing, the aft tires will contact the ground first, causing the bogie beam to rotate about main pivot 616. This motion may cause hydraulic strut 606 to experience an initial high tension load. Hydraulic strut 606 may move with initial low resistance to allow an air-ground sensing system to detect the change in pitch of the bogie beam. As the shock absorber 604 compresses, the bogie beam will continue to rotate about main pivot 616 until the forward tires contact the ground. Once the forward tires touch the ground, the hydraulic strut 606 may experience rapid compression. Hydraulic strut 606 may act as a damper during initial touchdown. In an illustrative embodiment, hydraulic strut 606 may allow the aircraft to land when hydraulic strut 606 is in a fully extended position as shown in FIG. 7, if no hydraulic pressure is available, in order to provide for an alternate landing position.

While on the ground, the hydraulic strut 606 allows for normal pitch motion of bogie beam 602 around a main pivot 616 without excessive loads in the hydraulic strut 606 and without overloading the tires. In an illustrative embodiment, hydraulic strut 606 may collapse short enough to prevent any unexpected conditions from impairing landing gear assembly 600 or the aircraft.

Considering FIGS. 6 through 8 together, a semi-levered landing gear assembly 600 in accordance with an illustrative embodiment of the disclosure is shown. The landing gear assembly 600 includes a shock absorber 604 of suitable construction to absorb and dampen transient loads exerted between the gear and the ground during ground operations of an aircraft, and to support the aircraft when stationary on the ground. The shock absorber 604 typically includes an upper portion 800 and a lower portion 802 that is telescopingly received in the upper portion such that the length of the shock absorber 604 can vary depending on the amount of the load applied to the landing gear assembly in a direction along the axis of the shock absorber. On initial touchdown, as shown in FIG. 8, the amount of load applied to the landing gear assembly 600 is relatively small and, accordingly, the length of the shock absorber 604 is about at a maximum.

The landing gear assembly 600 further includes a wheel truck 804 formed by at least one bogie beam 602 pivotally attached at main pivot 616 to a lower portion 802 of the shock absorber 604. A plurality of wheels 610 are rotatably supported by the bogie beam 602, including at least one forward wheel and at least one aft wheel respectively supported at a forward end and an aft end of the bogie beam 602. In general, for most large aircraft, the wheel truck of a main landing gear assembly may include a plurality of wheels 610, which may include a pair of forward wheels on an axle at the forward end of bogie beam 602 and a pair of aft wheels on an axle at the aft end of bogie beam 602. Some illustrative embodiments may include a plurality of wheels on one or more additional axles between the forward and aft axles. However, the illustrative embodiments described herein are applicable to any wheel truck configuration having at least one wheel supported by a bogie beam at a location that is longitudinally displaced forward of a main pivot and at least one wheel supported by a bogie beam at a location that is longitudinally displaced aft of a main pivot.

The landing gear assembly 600 also includes a hydraulic strut 606, which may be hydraulic actuator assembly 200 of FIG. 2. Hydraulic strut 606 is pivotally connected at its upper end to the lug 608 at the shock absorber 604 and has its lower end pivotally connected at lower lug pivot 612 on the bogie beam 602 at a location forward of main pivot 616. The hydraulic strut 606 is a variable-length device enabling the bogie beam 602 to pivot relative to the shock absorber 604. Additionally, the hydraulic strut 606 is capable of locking up at a fixed length, when suitably controlled as further described above, such that the bogie beam 602 is forced to pivot about lower lug pivot 612 rather than about main pivot 616, so as to provide a semi-levered function to the landing gear assembly 600.

Figure 9:
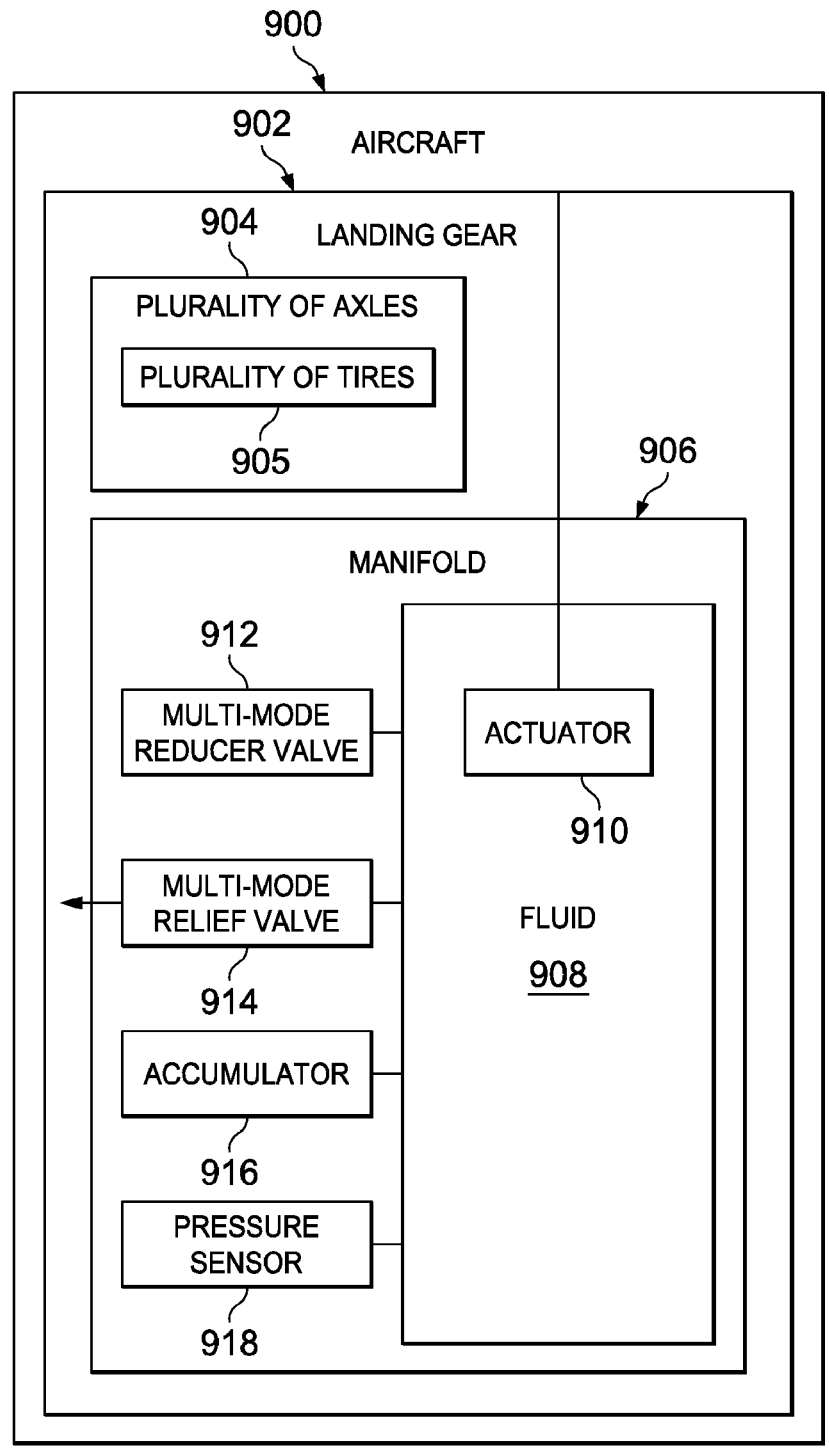
FIG. 9 is an illustration of a block diagram of an aircraft in accordance with an illustrative embodiment.

FIG. 9 is an illustration of a block diagram of an aircraft, in accordance with an illustrative embodiment. Aircraft 900 shown in FIG. 9 may be, for example, aircraft 100 shown in FIG. 1. The various components described with respect to FIG. 9 may also be found in FIGS. 2 through 8, as described further below.

Aircraft 900 includes landing gear 902, which may include a plurality of axles 904 upon which a plurality of tires 905 are disposed. Landing gear 902 may have, in other embodiments, one or more axles including one or more tires. Landing gear 902 may be, in some embodiments, landing gear assembly 108 of FIG. 1 or landing gear assembly 600 of FIGS. 6 through 8. Plurality of axles 904 may be, for example, part of bogie beam 602 of FIGS. 6 through 8. Plurality of tires 905 may be, for example, plurality of wheels 610 of FIGS. 6 through 8.

Landing gear 902 may also include manifold 906. An actuator 910 is disposed within manifold 906. In an illustrative embodiment, the pressure of fluid 908 may be varied and then applied to the actuator 910 such that landing gear 902 is restrained in a landing position by actuator 910 with a force that is suitably low to also allow for air-ground sensing during touchdown of the aircraft 900.

Fluid 908 may be, for example, the fluid that flows through a manifold disposed with respect to manifold 906. In a particular example, fluid 908 may flow within chambers, such as chambers 208, 210, and 212 of FIGS. 2 through 5. Actuator 910 may take other forms, as well, such as additional pistons in a nested piston arrangement.

In an embodiment, manifold 906 may include multi-mode reducer valve 912. Multi-mode reducer valve 912 may be, for example, multi-mode reducer 216 of FIG. 2. Multi-mode reducer valve 912 may be configured to allow variable pressure settings for fluid.

In an embodiment, manifold 906 may include multi-mode relief valve 914. Multi-mode relief valve 914 may be, for example, multi-mode relief valve 224 of FIG. 2. Multi-mode relief valve 914 may be configured to allow fluid 908 to exit manifold 906. In another embodiment, multi-mode relief valve 914 may be configured to reduce a pressure of fluid 908 while aircraft 900 is on the ground in order to balance loads among the plurality of axles 904.

In an embodiment, an accumulator 916 may be disposed with respect to manifold 906 such that accumulator 916 absorbs pressure spikes during touchdown of the aircraft 900. Accumulator 916 may be, for example, accumulator 248 of FIG. 2.

In an embodiment, pressure sensor 918 may be connected to at least one of manifold 906 and actuator 910. Pressure sensor 918 may be configured to monitor a health of landing gear 902. Pressure sensor 918 may be, for example, pressure sensor 240 of FIG. 2.

The illustration of aircraft 900 in FIG. 9 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

The different illustrative embodiments recognize and take into account that actuator 110 in FIG. 1, hydraulic actuator assembly 200 in FIGS. 2 through 5, hydraulic strut 606 in FIGS. 6 through 8, actuator 910 in FIG. 9, manifold 906 in FIG. 9, are examples of different implementations for a hydraulic actuator for a landing gear assembly. The different illustrative embodiments recognize and take into account that these hydraulic actuators use hydraulic fluid.

For example, the fluid flowing through manifold 122 in FIG. 1 and fluid 908 flowing through manifold 906 in FIG. 9 is hydraulic fluid. This hydraulic fluid may be, for example, without limitation, a liquid comprising, for example, without limitation, phosphate-ester hydraulic fluid.

The different illustrative embodiments recognize and take into account that the hydraulic actuator may have an alternate extension state when the aircraft performs an alternate landing. As used herein, an "alternate landing" is a landing performed when hydraulic system power is unavailable to control the landing gear for the aircraft. For example, an alternate landing may be an emergency landing.

During an alternate landing, a landing gear assembly for an aircraft may be configured with the wheeled truck assembly positioned with the forward axle lower than the aft axle. Consequently, the hydraulic actuator in the alternate extension state may need to compress more rapidly during an alternate landing as compared to a typical landing.

The different illustrative embodiments recognize and take into account that rapid compression of the hydraulic actuator may require that the hydraulic fluid be expelled from the hydraulic actuator. In some cases, this expulsion of hydraulic fluid from the hydraulic actuator may require higher flow rates than desired. Further, in some cases, managing these high flow rates may be more difficult and require larger and/or heavier components than desired.

The different illustrative embodiments recognize and take into account that a different configuration for the pistons used in actuator 110 in FIG. 1, hydraulic actuator assembly 200 in FIGS. 2 through 5, hydraulic strut 606 in FIGS. 6 through 8, and actuator 910 in FIG. 9 and/or introducing a compressible gas into these hydraulic actuators may allow these hydraulic actuators to rapidly compress during an alternate landing. In particular, using a compressible gas in a hydraulic actuator may reduce the amount of hydraulic fluid that needs to be expelled from the hydraulic actuator.

Thus, the different illustrative embodiments provide a hydraulic actuator configured to also use a compressible gas that does not need to be expelled from the hydraulic actuator when the hydraulic actuator is rapidly compressed during an alternate landing. In one illustrative embodiment, a hydraulic strut assembly comprises a housing, a first piston, a second piston, and a third piston. The housing comprises outer and inner cylindrical structures. An outer chamber is formed between the outer cylindrical structure and the inner cylindrical structure and is configured to receive a first fluid. The first piston is positioned between the outer and inner cylindrical structures. The second piston is nested within the first piston. The inner cylindrical structure, the first piston, and the second piston form an inner chamber in which a volume of the inner chamber changes when at least one of the first and second pistons move. The inner chamber is configured to hold a second fluid comprising a gas. The third piston is positioned between the outer cylindrical structure and the first piston. The first, second, and third pistons are configured to move in a direction parallel to an axis through the housing.

Figure 10:
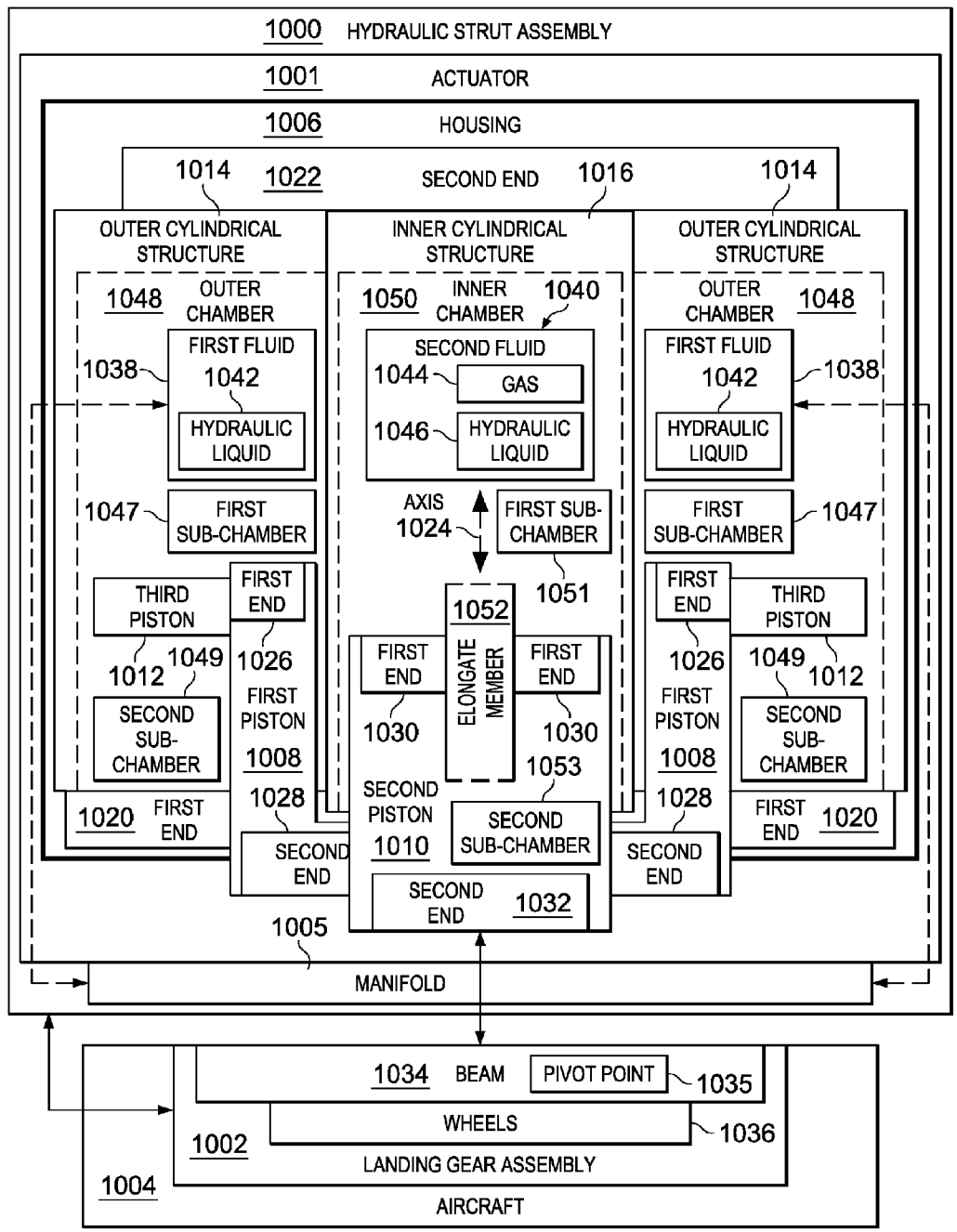
FIG. 10 is an illustration of a hydraulic strut assembly in the form of a block diagram in accordance with an illustrative embodiment.

Turning now to FIG. 10, an illustration of a hydraulic strut assembly in the form of a block diagram is depicted in accordance with an illustrative embodiment. In these illustrative examples, hydraulic strut assembly 1000 may be part of landing gear assembly 1002.

Hydraulic strut assembly 1000 may also be referred to as a strut assembly or a telescopic hydraulic strut assembly. Further, in some cases, hydraulic strut assembly 1000 may be referred to as an actuator assembly or a hydraulic actuator assembly.

Landing gear assembly 1002 is an example of one implementation for landing gear assembly 108 in FIG. 1. Landing gear assembly 1002 is a semi-levered landing gear assembly in these illustrative examples. As depicted, landing gear assembly 1002 may be part of aircraft 1004 in these examples. In other illustrative examples, landing gear assembly 1002 may be part of some other suitable type of aerospace vehicle.

Landing gear assembly 1002 may take the form of any assembly configured to enable semi-levered action. As depicted, hydraulic strut assembly 1000 in landing gear assembly 1002 comprises actuator 1001 and manifold 1005. In some illustrative examples, landing gear assembly 108 in aircraft 100 in FIG. 1 may use hydraulic strut assembly 1000 in FIG. 10 instead of actuator 110 in FIG. 1. Further, in other illustrative examples, landing gear 902 in FIG. 9 may use actuator 1001 and manifold 1005 in FIG. 10 instead of actuator 910 and manifold 906 in FIG. 9.

As depicted, actuator 1001 comprises housing 1006, first piston 1008, second piston 1010, and third piston 1012. First piston 1008, second piston 1010, and third piston 1012 may be referred to as hydraulic pistons in some illustrative examples. In other illustrative examples, first piston 1008, second piston 1010, and third piston 1012 may be referred to as a telescopic piston, a main piston, and a floating piston, respectively.

In these illustrative examples, housing 1006 comprises outer cylindrical structure 1014 and inner cylindrical structure 1016. Outer cylindrical structure 1014 may be formed by an outer wall having an inner surface and an outer surface. Inner cylindrical structure 1016 may be formed by an inner wall having an inner surface and an outer surface.

Inner cylindrical structure 1016 is located within outer cylindrical structure 1014. Further, inner cylindrical structure 1016 may be associated with outer cylindrical structure 1014. For example, housing 1006 has first end 1020 and second end 1022. First end 1020 may be the bottom end of housing 1006, while second end 1022 may be the top end of housing 1006. Inner cylindrical structure 1016 may be associated with outer cylindrical structure 1014 at second end 1022 of housing 1006.

Further, axis 1024 is an axis that runs through housing 1006 from first end 1020 of housing 1006 to second end 1022 of housing 1006. In one illustrative example, axis 1024 is a center axis through actuator 1001. For example, axis 1024 may be a center axis along which both inner cylindrical structure 1016 and outer cylindrical structure 1014 are aligned. In this manner, inner cylindrical structure 1016 and outer cylindrical structure 1014 may be concentric to each other with respect to axis 1024. Movement in a direction parallel to axis 1024 may be considered linear movement.

First piston 1008, second piston 1010, and third piston 1012 are associated with housing 1006. When one component is "associated" with another component, the association is a physical association in these illustrative examples. For example, a first component, such as first piston 1008, may be considered to be associated with a second component, such as housing 1006, by being secured to the second component, bonded to the second component, mounted to the second component, welded to the second component, fastened to the second component, and/or connected to the second component in some other suitable manner. Further, the first component may be movably connected to the second component such that at least one of these components may move relative to the other component.

Further, the first component also may be connected to the second component using a third component. The first component may also be considered to be associated with the second component by being formed as part of and/or an extension of the second component. For example, third piston 1012 is used to associate first piston 1008 with housing 1006. Further, first piston 1008 is used to associate second piston 1010 with housing 1006.

Additionally, the first component may be considered to be associated with the second component by being physically connected to the second component in a manner that physically constrains motion of the first component relative to the second component. For example, first piston 1008 may be associated with housing 1006 in a manner that causes motion of first piston 1008 to be constrained relative to housing 1006. The movement of first piston 1008 may be constrained to movement substantially parallel to axis 1024.

In particular, first piston 1008, second piston 1010, and third piston 1012 are a nested series of pistons. In these illustrative examples, these three pistons are concentric to each other with respect to axis 1024. In particular, first piston 1008 may be disposed within third piston 1012 and second piston 1010 may be disposed within first piston 1008. In this manner, first piston 1008, second piston 1010, and third piston 1012 may be substantially aligned with respect to axis 1024 in these illustrative examples.

First piston 1008 is positioned between outer cylindrical structure 1014 and inner cylindrical structure 1016. In particular, first piston 1008 is located between an inner surface of outer cylindrical structure 1014 and an outer surface of inner cylindrical structure 1016. Second piston 1010 is nested within first piston 1008.

As depicted, first piston 1008 has first end 1026 and second end 1028. First end 1026 may be the top end of first piston 1008, while second end 1028 may be the bottom end of first piston 1008. Further, second piston 1010 has first end 1030 and second end 1032. First end 1030 may be the top end of second piston 1010, while second end 1032 may be the bottom end of second piston 1010.

In these illustrative examples, first piston 1008 is configured to move in a direction parallel to axis 1024 relative to first end 1020 of housing 1006. In other words, first piston 1008 may move in a direction parallel to axis 1024 such that a position of first piston 1008 relative to first end 1020 of housing 1006 changes.

For example, a position of second end 1028 of first piston 1008 relative to first end 1022 of housing 1006 changes when first piston 1008 moves in a direction parallel to axis 1024. When first piston 1008 moves in a direction towards second end 1022 of housing 1006, first piston 1008 is considered to be retracting. When first piston 1008 moves in a direction away from second end 1022 of housing 1006, first piston 1008 is considered to be extending.

In these illustrative examples, second piston 1010 is configured to move in a direction parallel to axis 1024 relative to second end 1028 of first piston 1008. In other words, second piston 1010 may move in a direction parallel to axis 1024 such that a position of second piston 1010 relative to second end 1028 of first piston 1008 changes.

For example, the position of first end 1030 of second piston 1010 relative to second end 1028 of first piston 1008 changes when second piston 1010 moves in a direction parallel to axis 1024. When second piston 1010 moves in a direction towards second end 1022 of housing 1006, second piston 1010 is considered to be retracting. When second piston 1010 moves in a direction away from second end 1022 of housing 1006, second piston 1010 is considered to be extending.

When actuator 1001 is part of landing gear assembly 1002, second end 1032 of second piston 1010 may be connected to beam 1034 in landing gear assembly 1002. Beam 1034 may be referred to as a "truck beam" or a "bogie beam" in some illustrative examples. Beam 1034 is connected to wheels 1036 for landing gear assembly 1002.

In one illustrative example, beam 1034 may be configured to pivot about pivot point 1035. For example, second end 1032 of second piston 1010 may be connected to beam 1034 such that movement of second piston 1010 in a direction parallel to axis 1024 causes rotation of beam 1034 about pivot point 1035. Rotation of beam 1034 about pivot point 1035 may change the position of wheels 1036 relative to each other. Similarly, rotation of beam 1034 about pivot point 1035 may cause second piston 1010 to move in a direction parallel to axis 1024.

As depicted, third piston 1012 is located between an inner surface of outer cylindrical structure 1014 of housing 1006 and first piston 1008. Further, third piston 1012 may move in a direction parallel to axis 1024.

In these illustrative examples, movement of first piston 1008, second piston 1010, and third piston 1012 is controlled by first fluid 1038 and second fluid 1040 in actuator 1001. Outer chamber 1048 of actuator 1001 is configured to receive first fluid 1038. Inner chamber 1050 of actuator 1001 is configured to receive second fluid 1040.

Outer chamber 1048 is formed by the space between outer cylindrical structure 1014 and inner cylindrical structure 1016. In particular, this space includes the space surrounded by at least one of the inner surface of outer cylindrical structure 1014, the outer surface of inner cylindrical structure 1016, and first piston 1008.

In these illustrative examples, the volume of outer chamber 1048 that is configured to hold first fluid 1038 is determined by the position of first piston 1008. For example, the volume of outer chamber 1048 changes when first piston 1008 moves in a direction parallel to axis 1024.

Further, third piston 1012 is configured to move in a direction parallel to axis 1024 to cause outer chamber 1048 to divide into first sub-chamber 1047 and second sub-chamber 1049. The volumes of first sub-chamber 1047 and second sub-chamber 1049 are determined by the position of third piston 1012 within outer cylindrical structure 1014.

When third piston 1012 is located at first end 1020 of housing 1006 within outer cylindrical structure 1014, the volume of second sub-chamber 1049 may be substantially zero. However, as third piston 1012 moves away from first end 1020 and towards second end 1022 of housing 1006, the volume of second sub-chamber 1049 increases and the volume of first sub-chamber 1047 decreases.

Inner chamber 1050 is formed by inner cylindrical structure 1016 of housing 1006, first piston 1008, and second piston 1010. In these illustrative examples, the volume of inner chamber 1050 configured to hold second fluid 1040 is determined by the position of first piston 1008 and the position of second piston 1010. For example, the volume of inner chamber 1050 is changed when first piston 1008 and/or second piston 1010 moves in a direction parallel to axis 1024.

As depicted in these examples, first fluid 1038 comprises hydraulic liquid 1042, and second fluid 1040 comprises gas 1044 and hydraulic liquid 1046. Gas 1044 is a compressible gas in these examples. For example, gas 1044 may comprise nitrogen. Of course, in other illustrative examples, gas 1044 may comprise air, helium, and/or some other suitable type of compressible gas.

Hydraulic liquid 1042 and hydraulic liquid 1046 may be the same type of hydraulic liquid in these illustrative examples. These hydraulic liquids may comprise water, oil, phosphate-ester fluid, and/or other suitable types of hydraulic liquids.

Hydraulic liquid 1046 in inner chamber 1050 may be used to lubricate any devices associated with movement between inner cylindrical structure 1016, first piston 1008, and/or second piston 1010 that are exposed in inner chamber 1050. These devices may include, for example, without limitation, any number of bearings, seals, and/or other suitable types of mechanical devices.

The flow of first fluid 1038 into and out of outer chamber 1048 is controlled by manifold 1005 in hydraulic strut assembly 1000, in these illustrative examples. Manifold 1005 is associated with actuator 1001. Manifold 1005 is a structure comprising channels through which first fluid 1038 may flow. Any number of valves, ports, sensors, and/or other suitable components may be associated with this structure in manifold 1005 to control the flow of first fluid 1038 through manifold 1005, as well as the flow of first fluid 1038 into and out of outer chamber 1048.

The amount and pressure of first fluid 1038 in first sub-chamber 1047 and second sub-chamber 1049 in outer chamber 1048 may determine the position of third piston 1012 in outer chamber 1048. For example, as first fluid 1038 enters second sub-chamber 1049 and exits first sub-chamber 1047, third piston 1012 may float upwards through outer chamber 1048 in a direction parallel to axis 1024.

Movement of third piston 1012 may cause movement of first piston 1008. For example, the amount and/or pressure of first fluid 1038 in second sub-chamber 1049 may be increased such that third piston 1012 moves upwards, towards second end 1022 of housing 1006, in a direction parallel to axis 1024 and pushes against first end 1026 of first piston 1008. Third piston 1012 pushes against first end 1026 of first piston 1008 in a manner that moves first piston 1008 upwards in a direction parallel to axis 1024. In other words, when third piston 1012 pushes against first end 1026 of first piston 1008, first piston 1008 retracts until first end 1026 reaches second end 1022 of housing 1006.

Further, in these illustrative examples, first piston 1008 may be fully extended when the amount and/or pressure of first fluid 1038 in second sub-chamber 1049 is not sufficient enough to cause third piston 1012 to push against first end 1026 of first piston 1008. In other words, without third piston 1012 pushing against first end 1026 towards second end 1022 of housing 1006, first piston 1008 may fully extend.

Second fluid 1040 may be introduced into inner chamber 1050 in a number of different ways. As one illustrative example, an operator may pour hydraulic liquid 1046 into inner chamber 1050 through an open port. The operator may subsequently pump gas 1044 into inner chamber 1050. The operator may be, for example, a human operator, a robotic operator, or some other suitable type of operator.

When first piston 1008 and third piston 1012 are in retracted positions and a load is not being applied to second end 1032 of second piston 1010 by beam 1034, the pressure of gas 1044 causes gas 1044 within inner chamber 1050 to push against first end 1030 of second piston 1010 in a direction away from second end 1022 of housing 1006. In other words, the pressure of gas 1044 causes second piston 1010 to extend.

When the amount and/or pressure of first fluid 1038 in second sub-chamber 1049 is not sufficient enough to cause third piston 1012 and first piston 1008 to retract, the pressure of gas 1044 may cause second piston 1010 to fully extend. When second piston 1010 is fully extended, first end 1030 of second piston 1010 pushes against second end 1028 of first piston 1008 in the direction away from second end 1022 of housing 1006. Further, when second piston 1010 is fully extended, the volume of inner chamber 1050 is increased as compared to when second piston 1010 is retracted. The extension of second piston 1010 causes gas 1044 to expand and fill the increased volume of inner chamber 1050.

In these illustrative examples, when a compressive load is applied to second end 1032 of second piston 1010 by beam 1034, second piston 1010 may retract. This retraction may occur even when first piston 1008 and third piston 1012 are in retracted positions. When second piston 1010 retracts, gas 1044 is compressed. Further, when second piston 1010 is fully retracted, the volume of inner chamber 1050 is decreased as compared to when second piston 1010 is extended.

When both first piston 1008 and second piston 1010 are fully extended, actuator 1001 is configured to be fully extended. When first piston 1008 is fully retracted and second piston 1010 is fully retracted, actuator 1001 is considered to be fully compressed. When first piston 1008 is fully retracted and second piston 1010 is fully extended, actuator 1001 is configured to be retracted.

As depicted, second piston 1010 may have an open end to increase the volume of inner chamber 1050. Second piston 1010 may also have elongate member 1052. Elongate member 1052 may be configured to divide inner chamber 1050 into first sub-chamber 1051 and second sub-chamber 1053. First sub-chamber 1051 is located within inner cylindrical structure 1016. Second sub-chamber 1053 is located within second piston 1010.

In particular, elongate member 1052 may have open ends such that gas 1044 in inner chamber 1050 may move between first sub-chamber 1051 and second sub-chamber 1053. In one illustrative example, elongate member 1052 may extend into first sub-chamber 1051 beyond a fluid line for hydraulic liquid 1046 in inner chamber 1050. In this manner, the chances of hydraulic liquid 1046 entering the cavity inside second piston 1010 may be reduced. In another illustrative example, elongate member 1052 may extend into second sub-chamber 1053 to draw any hydraulic liquid 1046 from second sub-chamber 1053 into first sub-chamber 1051.

This action may occur when at least one of the second piston 1010 and the first piston 1008 extends.

In these illustrative examples, gas 1044 in inner chamber 1050 allows second piston 1010 to retract without the resistance of hydraulic liquid motion in response to wheels 1036 contacting ground with actuator 1001 in a fully extended state. Control of the positions and movement of first piston 1008, second piston 1010, and third piston 1012 using first fluid 1038 and second fluid 1040 is described in greater detail with respect to a particular implementation for hydraulic strut assembly 1100 in FIG. 11 below.

The illustration of hydraulic strut assembly 1000 in FIG. 10 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment For example, in some illustrative examples, pistons in addition to first piston 1008, second piston 1010, and third piston 1012 may be present in actuator 1001. In other illustrative examples, manifold 1005 may include components not described above. For example, manifold 1005 may include valves not described in FIG. 10.

Figure 11:
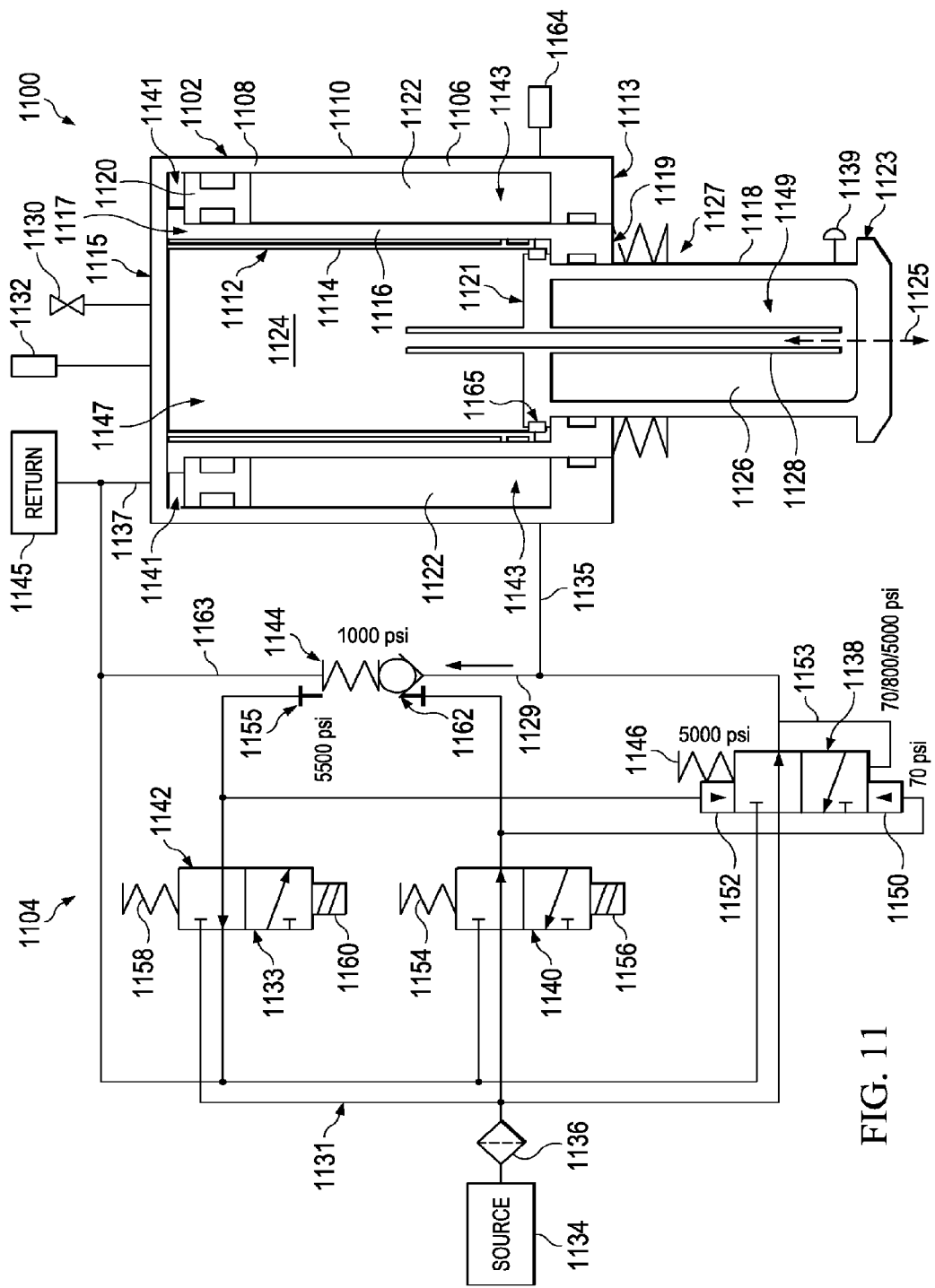
FIG. 11 is an illustration of a cross-sectional view of a hydraulic strut assembly in accordance with an illustrative embodiment.

FIG. 11 is an illustration of a cross-sectional view of a hydraulic strut assembly, depicted in accordance with an illustrative embodiment. In this illustrative example, hydraulic strut assembly 1100 is an example of one implementation for hydraulic strut assembly 1000 in FIG. 10. Hydraulic strut assembly 1100 may be used in a landing gear assembly, such as, for example, landing gear assembly 1002 in FIG. 10.

As depicted, hydraulic strut assembly 1100 comprises actuator 1102 and manifold 1104. Actuator 1102 is an example of one implementation for actuator 1001 in FIG. 10. Manifold 1104 is an example of one implementation for manifold 1005 in FIG. 10.

In this illustrative example, actuator 1102 includes housing 1106, first piston 1116, second piston 1118, and third piston 1120. Housing 1106, first piston 1116, second piston 1118, and third piston 1120 are examples of one implementation for housing 1006, first piston 1008, second piston 1010, and third piston 1012, respectively, in FIG. 10.

In this illustrative example, housing 1106 comprises outer cylindrical structure 1108 and inner cylindrical structure 1112. Further, housing 1106 has first end 1113 and second end 1115.

First piston 1116, second piston 1118, and third piston 1120 are associated with housing 1106 in this depicted example. First piston 1116 has first end 1117 and second end 1119. Second piston 1118 has first end 1121 and second end 1123.

First piston 1116, second piston 1118, and third piston 1120 are configured to move linearly in a direction parallel to axis 1125. Axis 1125 is a center axis through actuator 1102 in this depicted example. In particular, first piston 1116 may move in a direction parallel to axis 1125 relative to first end 1113 of housing 1106. Movement of first piston 1116 away from second end 1115 of housing 1106 is extension. Movement of first piston 1116 toward second end 1115 of housing 1106 is retraction.

Second piston 1118 may move in a direction parallel to axis 1125 relative to second end 1119 of first piston 1116. Movement of second piston 1118 toward second end 1115 of housing 1106 is retraction. Movement of second piston 1118 away from second end 1115 of housing 1106 is extension. When second piston 1118 retracts, second end 1123 of second piston 1118 may contact spring system 1127.

Spring system 1127 may comprise one or more springs associated with second end 1119 of first piston 1116 and/or second end 1123 of second piston 1118. Spring system 1127 may comprise, for example, at least one of a mechanical spring, a coil spring, a ring spring, a leaf spring, an elastomeric spring, and some other suitable of spring device.

Spring system 1127 is configured to compress in response to a load applied to spring system 1127 by second end 1123 of second piston 1118 and/or second end 1119 of first piston 1116. Spring system 1127 reduces the acceleration and/or force with which first piston 1116 retracts when second end 1123 of second piston 1118 contacts spring system 1127.

Further, spring system 1127 prevents second end 1123 of second piston 1118 from directly contacting second end 1119 of first piston 1116 when second piston 1118 retracts. In this manner, undesired effects to second end 1119 of first piston 1116 that may be caused by second end 1123 of second piston 1118 contacting second end 1119 of first piston 1116 may be prevented.

In this illustrative example, third piston 1120 is located between first piston 1116 and the inner surface of outer cylindrical structure 1108 of housing 1106. As depicted, third piston 1120 may move between first piston 1116 and outer cylindrical structure 1108 in a direction parallel to axis 1125. When third piston 1120 moves upwards towards second end 1115 of housing 1106, third piston 1120 may push first end 1117 of first piston 1116 towards second end 1115 of housing 1106, causing first piston 1116 to retract. When third piston 1120 moves away from second end 1115 of housing 1106, first piston 1116 is allowed to extend.

As depicted, outer chamber 1122 is formed in the space surrounded by outer cylindrical structure 1108, inner cylindrical structure 1112, and first piston 1116. Third piston 1120 divides outer chamber 1122 into first sub-chamber 1141 and second sub-chamber 1143. Movement of third piston 1120 in the direction parallel to axis 1125 causes the volumes of first sub-chamber 1141 and second sub-chamber 1143 to change.

Further, inner chamber 1124 is formed by inner cylindrical structure 1112, first piston 1116 and second piston 1118. Movement of second piston 1118 in a direction parallel to axis 1125 changes a volume of inner chamber 1124. In particular, the volume of inner chamber 1124 increases when second piston 1118 extends, and the volume of inner chamber 1124 decreases when second piston 1118 retracts. Additionally, extension of first piston 1116 also may increase the volume of inner chamber 1124.

In this illustrative example, second piston 1118 has tube 1128. Tube 1128 is an example of one implementation for elongate member 1052 in FIG. 10. Both ends of tube 1128 are open in this example. In this manner, tube 1128 connects first sub-chamber 1147 of inner chamber 1124 to second sub-chamber 1149 of inner chamber 1124. Second sub-chamber 1149 of inner chamber 1124 is formed by cavity 1126 inside second piston 1118. In some illustrative examples, one or both ends of tube 1128 may be partially open or partially covered.

Charge valve 1130 and pressure sensor 1132 are associated with second end 1115 of housing 1106 in this depicted example. Charge valve 1130 provides a mechanism for adding fluid to inner chamber 1124. In particular, both a hydraulic liquid and a compressible gas may be added to inner chamber 1124 through charge valve 1130. Alternatively, a separate port may be used to fill and/or drain hydraulic liquid from inner chamber 1124. Also, in some illustrative examples, port 1139 located near second end 1123 of second piston 1118 may be used for filling and/or draining fluid from inner chamber 1124. Pressure sensor 1132 is configured to measure the pressure of a compressible gas held in inner chamber 1124.

In this illustrative example, manifold 1104 of hydraulic strut assembly 1100 is associated with actuator 1102. Manifold 1104 is depicted in the form of a schematic in this depicted example. As depicted, manifold 1104 has plurality of channels 1131 and plurality of valves 1133 through which a hydraulic liquid may flow within manifold 1104.

The hydraulic liquid flowing through manifold 1104 may enter second sub-chamber 1143 of outer chamber 1122 through channel 1135 in plurality of channels 1131. The hydraulic liquid in first sub-chamber 1141 of outer chamber 1122 may return to manifold 1104 through channel 1137 in plurality of channels 1131.

Hydraulic liquid enters manifold 1104 from source 1134. Source 1134 may be any suitable type of supply of hydraulic liquid. For example, source 1134 may be a container or tank filled with hydraulic liquid. The hydraulic fluid in source 1134 may have sufficient pressure to enable movement of fluid through manifold 1104 and into second sub-chamber 1143 of outer chamber 1122 to facilitate movement of third piston 1120 and first piston 1116.

Hydraulic liquid flows from source 1134 into manifold 1104 through filter 1136. Further, hydraulic liquid may flow from manifold 1104 into return 1145. Return 1145 may take the form of, for example, without limitation, a storage container, a tank, or some other suitable component configured to hold hydraulic liquid received from manifold 1104.

The flow of hydraulic liquid through manifold 1104 is controlled using plurality of valves 1133. Plurality of valves 1133 includes valve 1138, valve 1140, valve 1142, and valve 1144. Valve 1138 may be a multi-mode pressure-reducing valve in this depicted example. Further, valve 1140 may be a first solenoid shut-off valve, and valve 1142 may be a second solenoid shut-off valve. Valve 1144 may be a multi-mode pressure-relief valve.

Spring 1146 indicates an "at rest" mode of operation for valve 1138. As depicted, when valve 1138 is at rest, hydraulic liquid flowing from filter 1136 is allowed to flow through channel 1135 and into second sub-chamber 1143 of outer chamber 1122. Valve 1138 is at rest when the pressure of hydraulic liquid at input 1150 has not reached a selected level and the pressure of hydraulic liquid at input 1153 has not reached a selected level.

When the actuator is to be placed in a retracted position, valve 1138 reduces pressure of source 1134 by sensing the outlet pressure at channel 1135 and compressing spring 1146 to adjust valve position and maintain a selected pressure level. Valve 1138 senses the pressure of channel 1135 as input 1153 into valve 1138. In this manner, hydraulic liquid may have a pressure of about 800 psi and may flow into second sub-chamber 1143 of outer chamber 1122 through channel 1135, retracting third piston 1120 and first piston 1118.

Valve 1138 may change positions based on input 1150, input 1152, and input 1153. When actuator 1102 is to be fully extended, the pressure of hydraulic liquid at input 1150 is increased to a selected level or greater. Consequently, the pressure level at input 1150 pushes against spring 1146 and valve 1138 changes position to allow the flow of hydraulic liquid from second sub-chamber 1143 of outer chamber 1122 into plurality of channels 1131 and valve 1138. This hydraulic fluid may exit manifold 1104 at return 1145. In this illustrative example, the outlet pressure for valve 1138 in channel 1135 may be about 70 psi.

The pressure of hydraulic liquid at the outlet of valve 1138 and channel 1135 is reduced such that third piston 1120 moves downwards freely. This movement of third piston 1120 allows first piston 1116 and second piston 1118 to extend such that actuator 1102 fully extends.

When the actuator is to be placed in a retracted position and locked, the pressure of hydraulic liquid at input 1152 is increased to a selected level or greater. Consequently, valve 1138 is blocked from moving to allow hydraulic liquid having a pressure substantially equal to source 1134 to flow through valve 1138 and into second sub-chamber 1143 of outer chamber 1122 through channel 1135. Pressure of source fluid 1134 may be, for example, without limitation, about 5000 psi.

Further, spring 1154 for valve 1140 indicates an at rest mode of operation for valve 1140. When valve 1140 is at rest, hydraulic liquid flowing from filter 1136 is allowed to pass through valve 1140 to input 1150 for valve 1138 and to input 1162 for valve 1144. Valve 1140 is at rest when solenoid actuator 1156 associated with valve 1140 is not activated. Solenoid actuator 1156 may be activated in response to electrical signals. These electrical signals may be received from a control system located onboard the aircraft.

When solenoid actuator 1156 is activated, spring 1154 is compressed and valve 1140 changes position to allow hydraulic liquid to flow towards return 1145 to reduce pressure levels at input 1162 for valve 1144 and input 1150 for valve 1138. Solenoid actuator 1156 may be activated when actuator 1102 is to be moved to the reacted position in which first piston 1116 is retracted and second piston 1118 is extended.

Spring 1158 for valve 1142 indicates an at rest mode of operation for valve 1142. When valve 1142 is at rest, hydraulic liquid is blocked from flowing through valve 1142. When actuator 1102 is to be retracted and locked, solenoid actuator 1160 associated with valve 1142 is activated. This activation causes spring 1158 to compress and valve 1142 to change position such that hydraulic liquid flowing from filter 1136 may flow through valve 1142 towards input 1152 for valve 1138 and input 1155 for valve 1144. This flow of hydraulic liquid towards input 1152 for valve 1138 increases the pressure at input 1152 and blocks valve 1138 from moving out of the at rest state. Further, the flow of hydraulic liquid towards input 1155 for valve 1144 increases the pressure at input 1155 and changes the pressure level at which valve 1144 will open and allow hydraulic liquid to flow through valve 1144.

Valve 1144 is configured to open to allow hydraulic liquid to flow from channel 1129 into channel 1163 when the pressure of the hydraulic liquid at channel 1129 reaches either a low pressure setting or a high pressure setting selected for valve 1144. The low pressure setting for valve 1144 may be any pressure value that is between the pressure value for source 1134 and the pressure value for return 1145. The high pressure setting for valve 1144 may be higher than the pressure value for source 1134.

The pressure value for source 1134 may be referred to as the source pressure. The pressure value for return 1145 may be referred to as the return pressure. If the source pressure is about 5000 psi, and the return pressure is about 70 psi, then the low pressure setting for valve 1144 may be about 1000 psi and the high pressure setting for valve 1144 may be about 5500 psi.

When the pressure of the hydraulic liquid at channel 1129 decreases to a pressure value that is lower than the low pressure setting for valve 1144, valve 1144 closes and blocks the flow of hydraulic liquid through valve 1144 into channel 1163. Additionally, when the pressure of hydraulic liquid at input 1162 reaches the desired level of pressure, valve 1144 will open to allow hydraulic liquid to flow from channel 1129 into channel 1163.

In this manner, plurality of valves 1133 controls the flow of hydraulic liquid through manifold 1104 as well as into and out of outer chamber 1122. Further, pressure sensor 1164 is configured to measure the pressure of hydraulic liquid within outer chamber 1122.

Additionally, seal system 1165 may be associated with first end 1121 of second piston 1118. Seal system 1165 may comprise any number of seals configured to allow second piston 1118 to move relative to inner cylindrical structure 1112 and provide a seal for inner chamber 1124. In particular, this seal for inner chamber 1124 is formed when second piston 1118 is retracted into inner cylindrical structure 1112 and seal system 1165 engages with the inner surface of inner cylindrical structure 1112.

Seal system 1165 may be configured to divide first sub-chamber 1147 of inner chamber 1124 into a first portion and a second portion. The first portion may be the portion of first sub-chamber 1147 above seal system 1165 and the second portion may be the portion of first sub-chamber 1147 below seal system 1165. As second piston 1118 is retracted into inner cylindrical structure 1112, the volume of the first portion of first sub-chamber 1147 decreases and the volume of the second portion of first sub-chamber 1147 increases. Alternately, as second piston 1118 is extended, the volume of the first portion of first sub-chamber 1147 increases and the volume of the second portion of first sub-chamber 1147 decreases. The change in the volume of the first portion and the second portion of first sub-chamber 1147 causes the hydraulic liquid portion of the second fluid to be forced past seal system 1165 to provide resistance to the movement of the second piston 1118.

Further, retraction of second piston 1118 causes the seal formed by seal system 1165 to be moved.

Figure 14:
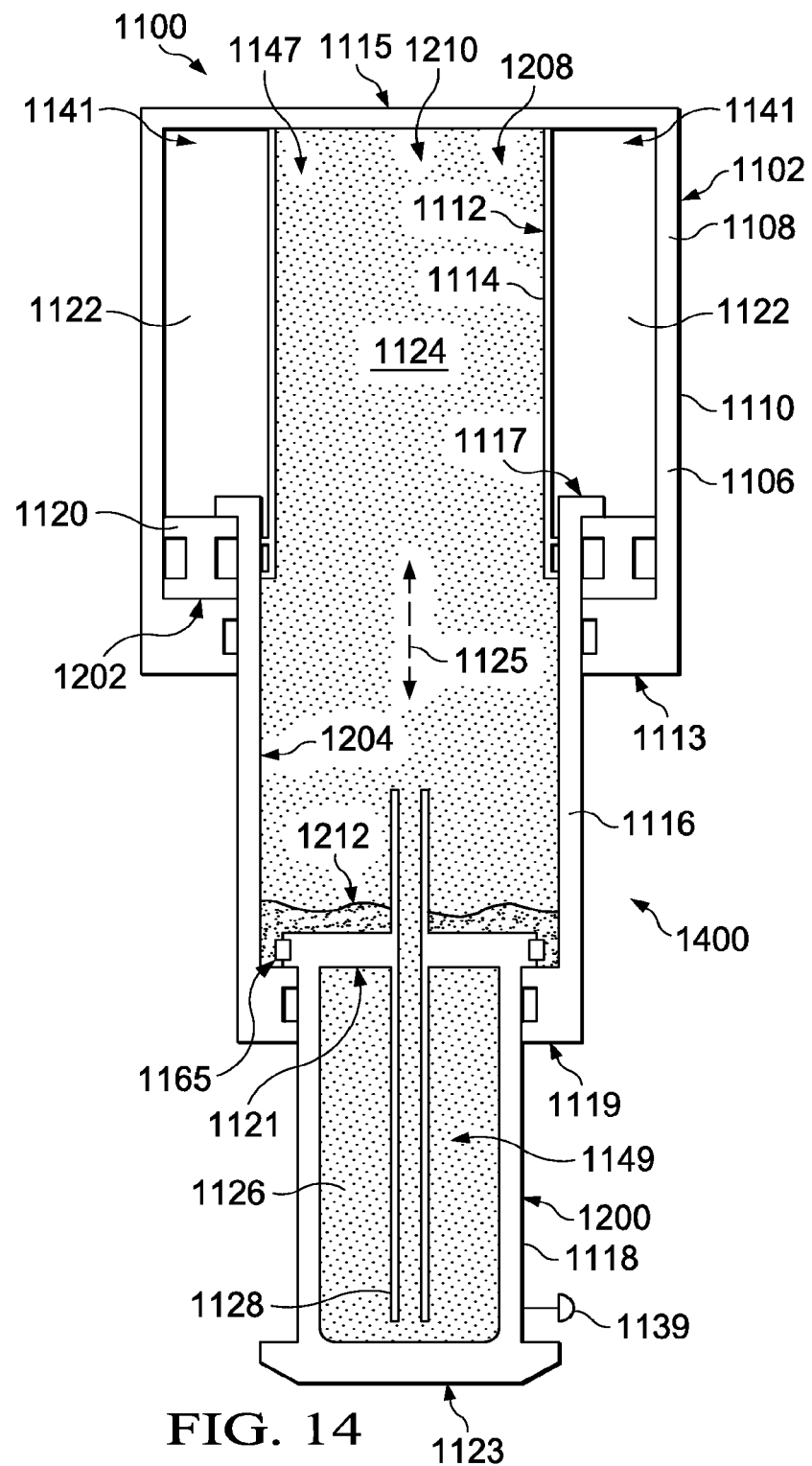
FIG. 14 is an illustration of an actuator in a fully extended position in accordance with an illustrative embodiment.

FIGS. 12 through 14 are illustrations of different positions for the pistons in an actuator, depicted in accordance with an illustrative embodiment. In FIGS. 12 through 14, actuator 1102 from FIG. 11 is depicted in a compressed position, a retracted position, and an extended position, respectively.

FIG. 12 is an illustration of actuator 1102 in a compressed position, depicted in accordance with an illustrative embodiment. In this illustrative example, actuator 1102 has compressed position 1200. Actuator 1102 may have compressed position 1200 when, for example, the aircraft in which actuator 1102 is used is parked on the ground.

As depicted, third piston 1120 and first piston 1116 are in retracted positions 1202 and 1204, respectively. In other words, third piston 1120 has moved upwards such that first piston 1116 is fully retracted such that first end 1117 of first piston 1116 is at second end 1115 of housing 1106.

In this illustrative example, a compressive load has been applied to second end 1123 of second piston 1118 to cause second piston 1118 to partially retract. In particular, first end 1121 of second piston 1118 has moved upwards and away from second end 1119 of first piston 1116. The load applied to second end 1123 of second piston 1118 may be a load transferred to second end 1123 of second piston 1118 in response to the landing gear assembly contacting the ground.

The positions of first piston 1116, second piston 1118, and third piston 1120 in FIG. 12 may be determined by first fluid 1206 in outer chamber 1122 and second fluid 1208 in inner chamber 1124. First fluid 1206 is a hydraulic liquid. This hydraulic liquid may be introduced into outer chamber 1122 by manifold 1104 in FIG. 11. Further, first fluid 1206 may flow out of outer chamber 1122 and return to manifold 1104 in FIG. 11.

Second fluid 1208 comprises both gas 1210 and hydraulic liquid 1212. Gas 1210 is a compressible gas. When second piston 1118 retracts, gas 1210 compresses. The compressibility of gas 1210 allows for rapid compression of the second piston without the resistance of fluid flow. Second fluid 1208 may be introduced into inner chamber 1124 through charge valve 1130 in FIG. 11. Hydraulic liquid 1212 is used to lubricate seal system 1165 and reduce undesired effects to seal system 1165 in response to operation of actuator 1102.

When first piston 1116 is fully retracted, seal system 1165 forms a seal between first end 1121 of second piston 1118 and a lower end of inner cylindrical structure 1112. When second piston 1118 moves, second fluid 1208 will flow past seal system 1165. Seal system 1165 may include a small fluid passage to allow the speed of movement of second piston 1118 to be reduced. In this manner, bogie beam motion may be dampened when the aircraft is traveling on the ground.

As depicted, tube 1128 extends into inner chamber 1124 above a fluid line for hydraulic liquid 1212. In this manner, the possibility of hydraulic liquid 1212 entering cavity 1126 may be reduced. However, gas 1210 may be allowed to expand into cavity 1126.

As depicted in FIG. 12, tube 1128 extends into inner chamber 1124 such that hydraulic liquid 1212 does not enter cavity 1126. In some cases, a portion of hydraulic liquid 1212 may enter cavity 1126 through tube 1128 when actuator 1102 is compressed. In these examples, extension of second piston 1118 and/or first piston 1116 may cause gas 1210 to expand such that a pressure within inner chamber 1124 is reduced. The pressure in inner chamber 1124 may be reduced to a level below the pressure in cavity 1126. Consequently, any gas 1210 and/or any hydraulic liquid 1212 in cavity 1126 may be expelled from cavity 1126, having a higher pressure, into inner chamber 1124, having a lower pressure, through tube 1128.

FIG. 13 is an illustration of actuator 1102 in a retracted position, depicted in accordance with an illustrative embodiment. In this illustrative example, actuator 1102 has retracted position 1300. In particular, third piston 1120 has retracted position 1202, first piston 1116 has retracted position 1204, and second piston 1118 is fully extended when actuator 1102 has retracted position 1300.

Actuator 1102 may be configured to have retracted position 1300 when actuator 1102 is to be in a landing position and/or a locked position. Actuator 1102 may be in a landing position when, for example, the aircraft has prepared the landing gear for landing onto the ground. Actuator 1102 may be in a locked position when, for example, the aircraft is traveling on a runway in preparation for takeoff.

FIG. 14 is an illustration of actuator 1102 in a fully extended position depicted in accordance with an illustrative embodiment. In this illustrative example, actuator 1102 is considered to be in fully extended position 1400. In particular, both first piston 1116 and second piston 1118 are fully extended when actuator 1102 is in fully extended position 1400.

Actuator 1102 may be in fully extended position 1400 when the amount and/or pressure of first fluid 1206 from FIGS. 12-13 in second sub-chamber 1143 of outer chamber 1122 has been reduced such that pressure of second fluid 1208 forces gas 1210 to expand, first piston 1116 and second piston 1118 to extend, and third piston 1120 to move downwards.

Figure 15:
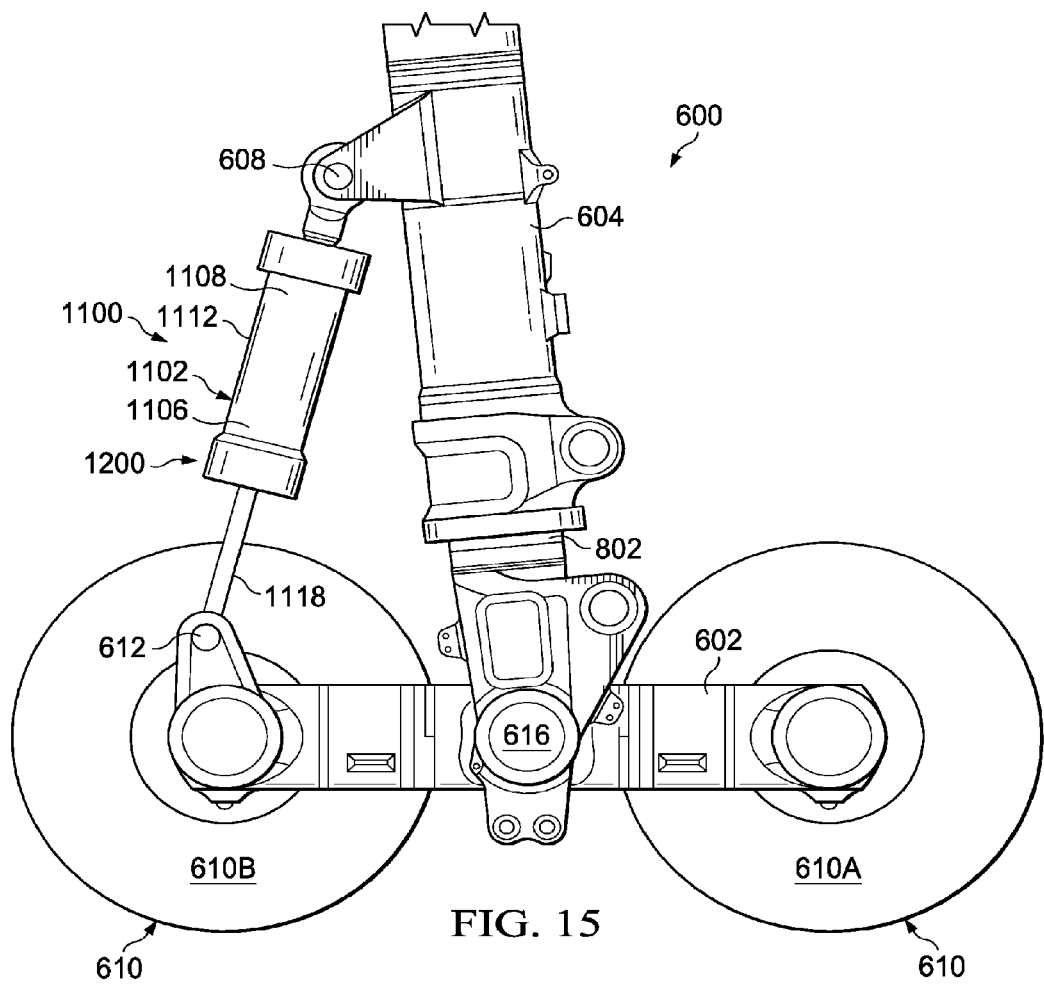
FIG. 15 is an illustration of a landing gear assembly with an actuator in a compressed position in accordance with an illustrative embodiment.

FIG. 15 is an illustration of a landing gear assembly with an actuator in a compressed position depicted in accordance with an illustrative embodiment. In this illustrative example, landing gear assembly 600 from FIG. 6 is depicted having hydraulic strut assembly 1100 from FIG. 11 instead of hydraulic strut 606 in FIG. 6. Manifold 1104 for hydraulic strut assembly 1100 may not be seen in this view. As depicted, landing gear assembly 600 is in a ground position. In this ground position, actuator 1102 has compressed position 1200 from FIG. 12.

Figure 16:
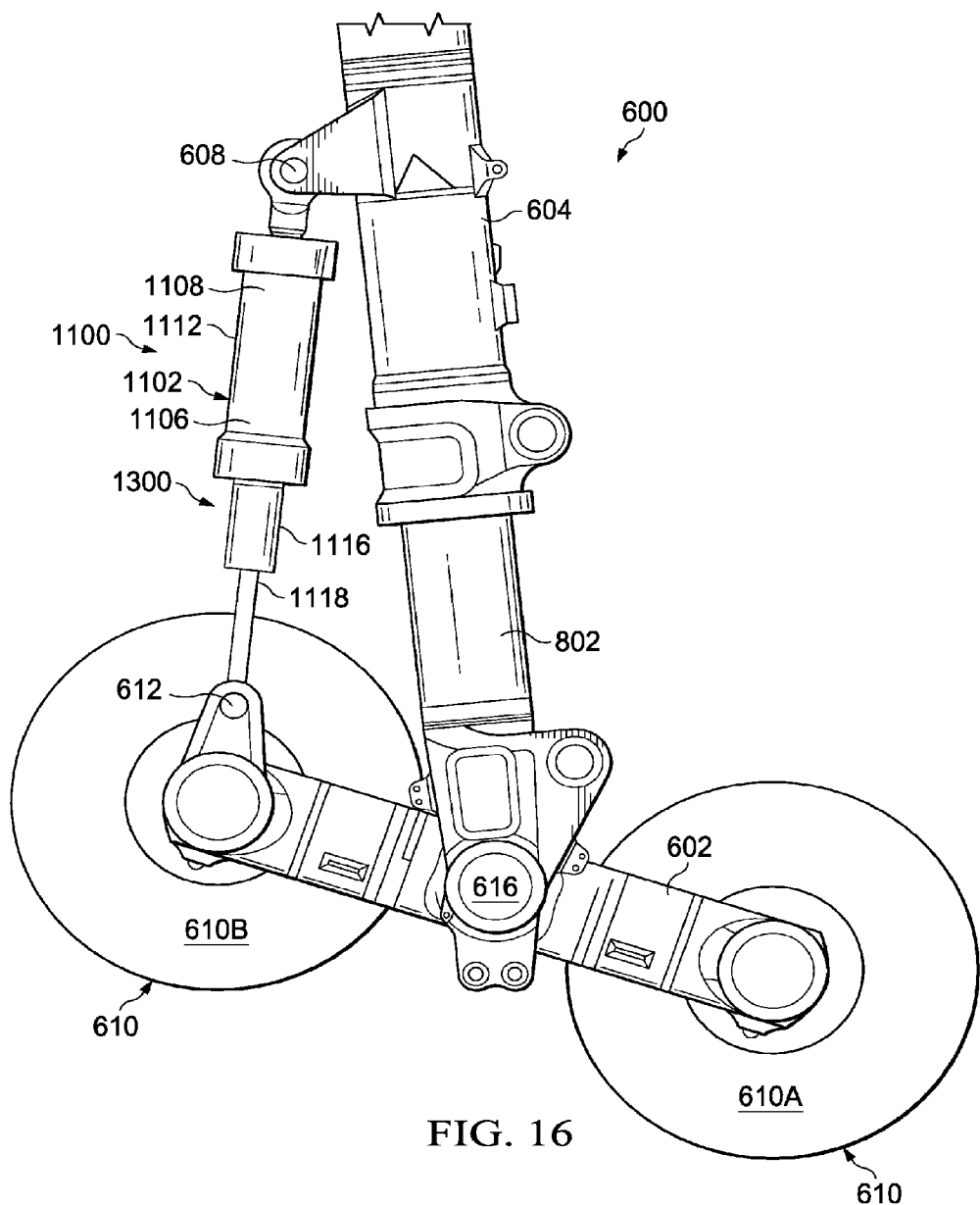
FIG. 16 is an illustration of a landing gear assembly with an actuator in a retracted position in accordance with an illustrative embodiment.

FIG. 16 is an illustration of a landing gear assembly with an actuator in a retracted position depicted in accordance with an illustrative embodiment. In this illustrative example, landing gear assembly 600 from FIG. 8 is depicted having hydraulic strut assembly 1100 from FIG. 11 instead of hydraulic strut 606 in FIG. 8. As depicted, landing gear assembly 600 is in a landing position. In this landing position, actuator 1102 has retracted position 1300 from FIG. 13.

Figure 17:
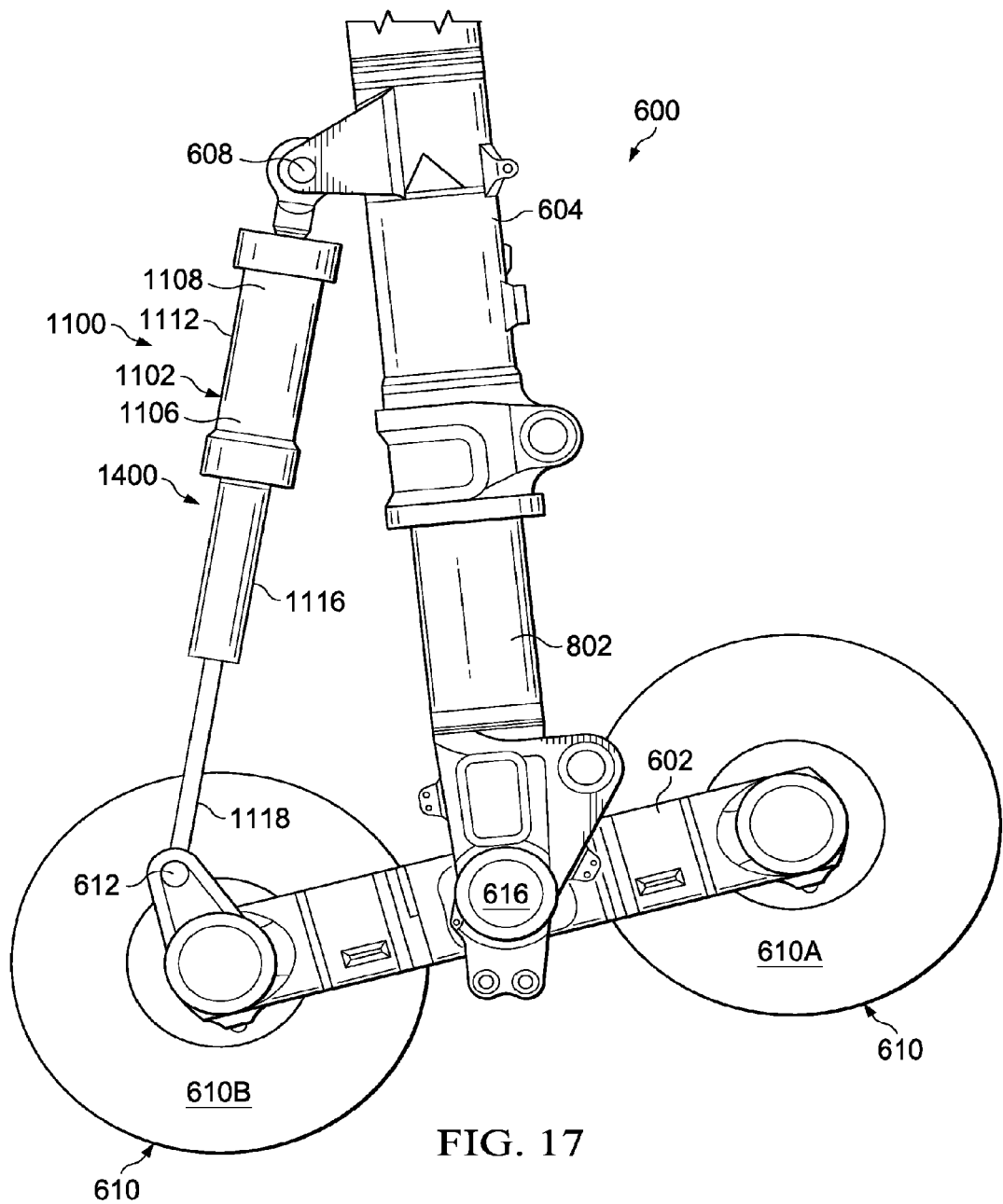
FIG. 17 is an illustration of a landing gear assembly with an actuator in a fully extended position in accordance with an illustrative embodiment.

FIG. 17 is an illustration of a landing gear assembly with an actuator in a fully extended position depicted in accordance with an illustrative embodiment. In this illustrative example, landing gear assembly 600 from FIG. 7 is depicted having hydraulic strut assembly 1100 from FIG. 11 instead of hydraulic strut 606 in FIG. 7. As depicted, landing gear assembly 600 is in a stow position. In this stow position, actuator 1102 has fully extended position 1400 from FIG. 14.

Figure 18:
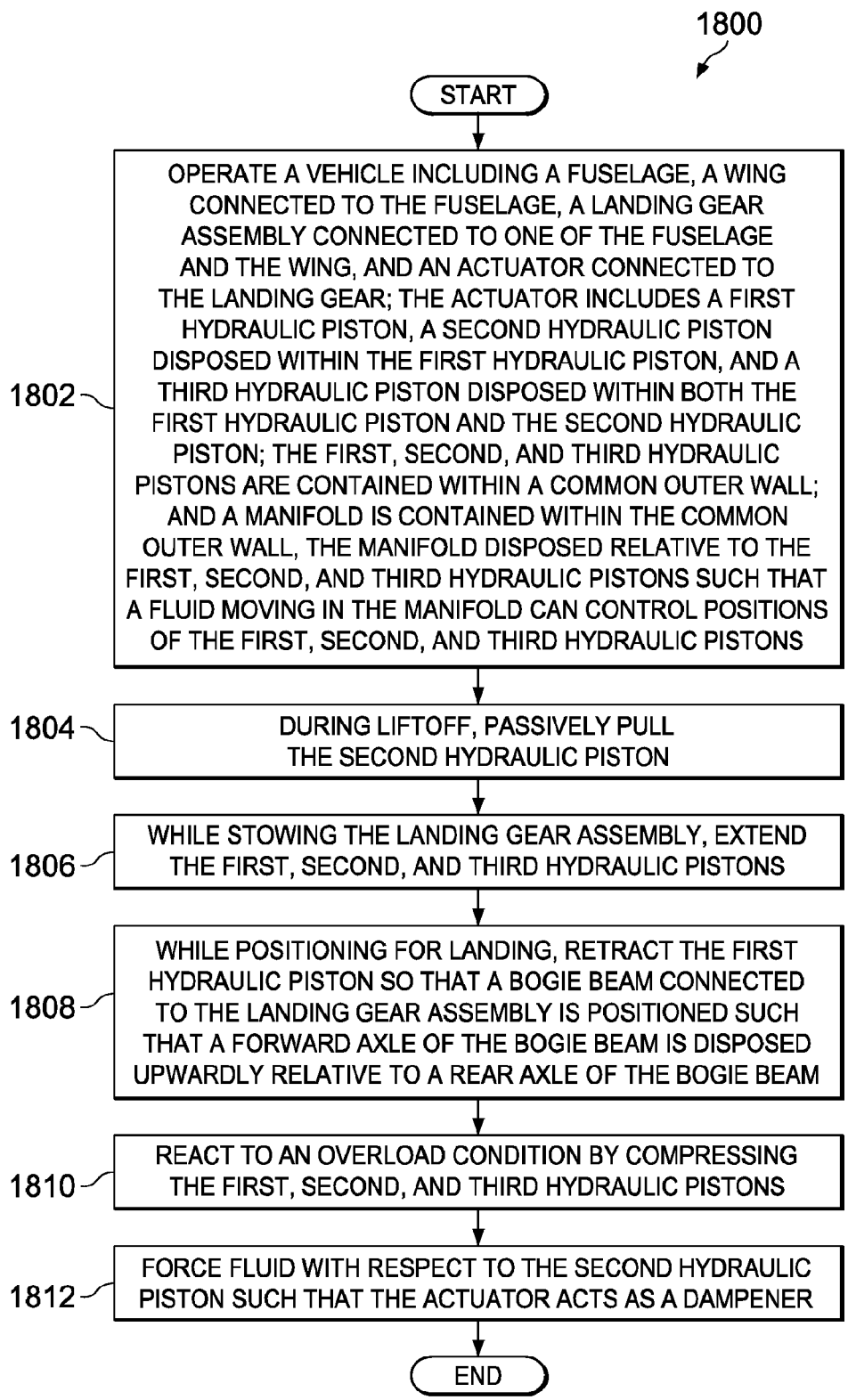
FIG. 18 is an illustration of a flowchart of a method of operating a hydraulic actuator in an aircraft, in accordance with an illustrative embodiment.

FIG. 18 is an illustration of a flowchart of a method of operating a hydraulic actuator in an aircraft, in accordance with an illustrative embodiment. The process shown in FIG. 18 may be implemented using a hydraulic actuator assembly 200, such as that shown in FIG. 2 through FIG. 5, or may be implemented using a hydraulic strut 606, such as that shown in FIGS. 6 through 8.

The process 1800 begins by operating a vehicle, the vehicle comprising: a fuselage; a wing connected to the fuselage; a landing gear assembly connected to one of the fuselage and the wing; an actuator connected to the landing gear assembly, wherein the actuator comprises: a first hydraulic piston; a second hydraulic piston disposed within the first hydraulic piston; and a third hydraulic piston disposed within both the first hydraulic piston and the second hydraulic piston, wherein the first, second, and third hydraulic pistons are contained within a common outer wall; and a manifold is contained within the common outer wall, the manifold disposed relative to the first, second, and third hydraulic pistons such that a fluid moving in the manifold can control positions of the first, second, and third hydraulic pistons (operation 1802). In an illustrative embodiment the method may include, during liftoff, passively pulling the second hydraulic piston (operation 1804). In an illustrative embodiment, the method may further include, while stowing the landing gear assembly, extending the first, second, and third hydraulic pistons (operation 1806).

In an illustrative embodiment, the method may further include, while positioning for landing, retracting the first hydraulic piston so that a bogie beam connected to the landing gear assembly is positioned such that a forward axle of the bogie beam is disposed upwardly relative to a rear axle of the bogie beam (operation 1808). In an illustrative embodiment, the method may further include reacting to an overload condition by compressing the first, second, and third hydraulic pistons (operation 1810). In an illustrative embodiment, the method may further include forcing fluid with respect to the second hydraulic piston such that the actuator acts as a dampener (operation 1812). The process terminates thereafter.

Thus, the illustrative embodiments provide for an actuator. The actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall.

The illustrative embodiments present provide for a nested piston actuator that is flexible, durable, light weight, and relatively inexpensive compared to other actuators. Additionally, the illustrative embodiments have added further value to aircraft operation in that the illustrative embodiments aid an aircraft in both landing and lift off. The illustrative embodiments aid an aircraft to lift off by increasing the height of the landing gear assembly at the time of initial take-off rotation, which allows a higher angle of attack. Other illustrative embodiments are apparent from the following additional description.

FIG. 19 is an illustration of a process for operating a vehicle during an alternate landing in the form of a flowchart depicted in accordance with an illustrative embodiment. The process described in FIG. 19 may be implemented using hydraulic strut assembly 1000 in FIG. 10. For example, this process may be used to operate aircraft 1004 in FIG. 10 when aircraft 1004 performs an alternate landing.

The process begins by operating the aircraft during an alternate landing in which the aircraft comprises a landing gear assembly with an actuator comprising a housing, a first piston, and a second piston (operation 1900). During an alternate landing, the landing gear assembly for the aircraft may be in a stow position. In particular, the actuator in the landing gear assembly may be in a fully extended position.

In this illustrative example, the housing of the actuator comprises an outer cylindrical structure and an inner cylindrical structure. The outer cylindrical structure and the inner cylindrical structure form an outer chamber configured to receive a first fluid. The first piston is configured to move in a direction parallel to an axis through the housing relative to a first end of the housing.

Further, the second piston is configured to move in the direction parallel to the axis through the housing relative to a second end of the first piston such that a volume of an inner chamber formed by the inner cylindrical structure and the second piston changes. The inner chamber is configured to hold a second fluid in which the second fluid comprises a gas that is compressible.

Thereafter, the process retracts the second piston and then the first piston in response to a load being applied to the second piston when the landing gear assembly contacts a ground on which the aircraft is landing (operation 1902). The gas in the inner chamber compresses when the second piston and the first piston retract. In operation 1902, the gas allows the second piston and the first piston to be retracted when the aircraft touches the ground during the alternate landing. Further, with the compressible gas in the inner chamber, the second fluid that is present in the inner chamber is not expelled from the inner chamber during the retraction of the second piston and the first piston.

The flowcharts and block diagrams in the different depicted illustrative embodiments illustrate the architecture, functionality, and operation of some possible implementations of apparatus and methods in different illustrative embodiments. In this regard, each block in the flowchart or block diagrams may represent a module, segment, function, and/or a portion of an operation or step. The illustrative embodiments may be manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 may go through certification and delivery 2010 in order to be placed in service 2012. While in service 2012 by an operator, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, environmental system 2114, and landing gear system 2116. Landing gear system 2116 may include one or more landing gear assemblies such as, for example, without limitation, landing gear assembly 108 in FIG. 1, landing gear assembly 600 in FIGS. 6 through 8, landing gear 902 in FIG. 9, landing gear assembly 1002 in FIG. 10, or landing gear assembly 600 in FIGS. 16 through 17. Any number of other systems may be included in systems 2104, depending on the implementation.

Apparatus and methods embodied herein may be employed during at least one of the stages of aircraft manufacturing and service method 2000 in FIG. 20. For example, actuator 110 in FIG. 1, hydraulic actuator assembly 200 in FIGS. 2 through 5, hydraulic strut 606 in FIGS. 6 through 8, actuator 910 in FIG. 9, or hydraulic strut assembly 1000 may be formed and added to landing gear system 2116 for aircraft 2100 during at least one of component and subassembly manufacturing 2206, system integration 2208, and maintenance and service 2014.

In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. One or more apparatus embodiments, method embodiments, or a combination thereof may be utilized while aircraft 2100 is in service 2012 and/or during maintenance and service 2014 in FIG. 20. The use of a number of the different illustrative embodiments may substantially expedite the assembly of and/or reduce the cost of aircraft 2100.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Thus, the illustrative embodiments provide for a guide tube and a floating piston disposed within the guide tube. The floating piston is configured within the guide tube such that a landing gear connected to the floating piston may extend rapidly to the stow position relative to a mechanical device for retracting a landing gear.

The illustrative embodiments also provide for an actuator including a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. A manifold is connected to the first, second, and third hydraulic pistons. The manifold is disposed relative to the first, second, and third hydraulic pistons such that a fluid moving in the manifold can control positions of the first, second, and third hydraulic pistons.

The embodiments also provide for a vehicle including a fuselage, a wing connected to the fuselage, and a landing gear assembly connected to at least one of the fuselage and the wing. The vehicle further includes a hydraulic actuator connected to the landing gear assembly. The hydraulic actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. The hydraulic actuator further includes a manifold connected to the first, second, and third hydraulic pistons. The manifold is disposed relative to the first, second, and third hydraulic pistons such that a fluid moving in the manifold can control positions of the first, second, and third hydraulic pistons.

The embodiments also provide for a method for operating a vehicle. The vehicle includes a fuselage, a wing connected to the fuselage, and a landing gear assembly connected to one of the fuselage or the wing. An actuator is connected to the landing gear assembly. The actuator includes a first hydraulic piston, a second hydraulic piston disposed within the first hydraulic piston, and a third hydraulic piston disposed within both the first hydraulic piston and the second hydraulic piston. The first, second, and third hydraulic pistons are contained within a common outer wall. A manifold is connected to the first, second, and third hydraulic pistons. The manifold is disposed relative to the first, second, and third hydraulic pistons such that a fluid moving in the manifold can control positions of the first, second, and third hydraulic pistons.

Further, the different illustrative embodiments provide a hydraulic actuator, such as actuator 1001 in FIG. 10, configured to use a compressible gas that may not need to be expelled from the hydraulic actuator when the hydraulic actuator is rapidly compressed during an alternate landing. In one illustrative embodiment, a hydraulic strut assembly comprises a housing, a first piston, a second piston, and a third piston. The housing comprises outer and inner cylindrical structures. An outer chamber is configured to receive a first fluid that is formed between the outer cylindrical structure and the inner cylindrical structure. The first piston is positioned between the outer and inner cylindrical structures. The second piston is nested within the first piston. The inner cylindrical structure, the first piston, and the second piston form an inner chamber in which a volume of the inner chamber changes when at least one of the first and second pistons move. The inner chamber is configured to hold a second fluid comprising a gas. The third piston is positioned between the outer cylindrical structure and the first piston. The first, second, and third pistons are configured to move in a direction parallel to an axis through the housing.

The telescopic feature of the actuator in the telescopic hydraulic strut assembly provided by the different illustrative embodiments allows for a smaller overall package than the currently available and/or proposed systems. The valves within the manifold are configured to control pressure within the actuator, thereby allowing the telescopic hydraulic strut assembly to serve multiple functions. The more compact design has reduced weight as compared to currently available systems and may be used on aircraft landing gears that do not have sufficient space for some of the currently available semi-levered gear systems.

The actuator provided by the different illustrative embodiments comprises a fixed outer housing assembly with one closed end, the head end, one open end, and the rod end that houses three moveable pistons. The outer cylinder structure of the actuator is pivotally connected to the upper portion of the landing gear shock strut. One of the three pistons, the second piston, is pivotally connected to the forward end of the bogie beam of the landing gear. The three pistons slide axially within the outer housing. Movement of the piston may be controlled by the movement of fluids in or out of the actuator, as controlled by the valve module, or by the landing gear as it pushes or pulls against the attachment ends of the actuator. The valve manifold, when connected to a pressurized hydraulic fluid delivery system, will control fluid flow in and out of the actuator with the use of electrically commanded solenoid control valves, pressure reducing valves, pressure relief valves, and/or check valves.

In another illustrative embodiment, the hydraulic strut assembly comprises a housing, a first piston, a second piston, and a third piston. The housing comprises an outer cylindrical structure and an inner cylindrical structure. The inner cylindrical structure, the first piston, and the second piston form an inner chamber configured to hold a fluid comprising a gas and a hydraulic liquid. The inner chamber may have a first sub-chamber and a second sub-chamber. The gas is compressible such that at least one of the first piston and the second piston may be retracted without expelling the second fluid from the inner chamber.

Further, the hydraulic strut assembly may also include a seal system associated with at least one of the first piston and the second piston. The seal system may be configured to divide the first sub-chamber of the inner chamber into a first portion and a second portion and provide a seal between the first portion and the second portion of the first sub-chamber when the second piston retracts. When a volume of the first portion of the first sub-chamber increases and a volume of the second portion of the second sub-chamber decreases in response to the second piston extending, the hydraulic liquid of the second fluid may be moved past the seal system to provide resistance to the movement of the second piston. Additionally, the hydraulic liquid may provide lubrication for the seal system.

In one illustrative embodiment, the actuator is fully extended to position the landing gear bogie beam in a configuration with the forward axle lower than the aft axle, such as actuator 1102 in fully extended position 1400 in FIG. 14 and FIG. 17. This position may facilitate stowage of the landing gear within an aircraft wheel well. The actuator achieves the fully extended position when the control valves open the outer chambers to the external hydraulic fluid return system. The inner chamber contains a compressible mixture of fluid that is charged to a predetermined pressure during maintenance of the hydraulic strut assembly. The pressure within the inner chamber forces the movement of the pistons to extend. Extension rate of the pistons is controlled by a variable restriction of the fluid that is expelled from the outer chamber of the actuator.

In another illustrative embodiment, the actuator is partially retracted to position the landing gear bogie beam in a configuration with the forward axle higher than the aft axle, such as actuator 1102 in retracted position 1300 in FIG. 13 and FIG. 16. This position may position the bogie beam in the optimum touchdown configuration. The actuator achieves the partially retracted position when the manifold provides control of hydraulic fluid to and from the outer chambers. This action retracts the first and third pistons. The inner chamber contains a compressible fluid that is charged to a predetermined pressure during maintenance of the hydraulic strut assembly. The pressure within the inner chamber forces the movement of the second piston to extend.

The semi-levered function is enabled by forcibly holding the third piston retracted against the outer housing and thereby preventing the extension of the first and third pistons as the aircraft rotates for takeoff and the landing gear bogie beam tries to rotate the forward axle away from the aircraft reference. This motion will attempt to extend the actuator pistons. With highly pressurized hydraulic fluid applied by the control valves to the outer chamber, the fluid acts against the area of the third piston to resist the pulling force of the bogie beam and prevent extension of the first and third pistons. A pressure relief valve prevents over-pressurization of the fluid in the outer chamber.

In one illustrative embodiment, the aircraft is situated with all tires on the ground and the actuator position is controlled by the landing gear. The actuator may be in a compressed position, such as actuator 1102 in compressed position 1200 in FIG. 12 and FIG. 15. The actuator length may be influenced by the angle of the bogie beam with respect to the landing gear shock strut and the extension amount of the landing gear shock strut. The desired response from the actuator in this condition is to minimize unequal load distribution on the tires and provide a resistive force that dampens rotations of the bogie beam. The pressure of the compressible fluid within the inner chamber and the pressure of the hydraulic fluid within the outer chambers are controlled to provide such motive force acting on the pistons to affect an insignificantly unbalanced load distribution on the tires. Another desired response from the actuator in this condition is to affect damping of the bogie beam rotations. To dampen bogie beam rotation, the fluid in the inner chamber is forced thru a fluid flow restricting device as the second piston is extended. Additionally, the inner chamber is partially filled with compressible gas and partially filled with hydraulic liquid.

The actuator provided by the different illustrative embodiments, such as actuator 1001 in FIG. 10 and actuator 1102 in FIGS. 11-17, provides a dampening effect on the bogie beam during touchdown of the aircraft. Touchdown can cause rapid rotation of the bogie beam and therefore very rapid linear motion of the actuator pistons. A routine touchdown will affect extension of the first and third pistons that will force hydraulic fluid through a restrictive passage and resist motion of the bogie beam. A non-routine, or alternate, touchdown will affect compression of the first and second pistons that will compress the gas within the first fluid chamber. A mechanical spring placed between the first and second pistons provides control of accelerations during contact between the pistons.

The telescopic hydraulic strut assembly described by the different illustrative embodiments provides different types of functionality when installed on a conventional multi-axle landing gear and during typical operation of an aircraft. In particular, the telescopic hydraulic strut assembly described by the different illustrative embodiments provides the ability to position the bogie beam in two positions while the aircraft is in flight. The first position is for stowage of the landing gear within a wheel well, and the other position is a position appropriate for landing the aircraft.

Further, the telescopic hydraulic strut assembly described by the different illustrative embodiments provides the ability to inhibit extension of the actuator, known as lock-up, and hold the forward axle of the bogie beam at a constant distance from the aircraft reference, thereby causing the bogie beam to pivot about the forwardly located attachment of the telescopic hydraulic strut as the landing gear shock strut extends during takeoff. This effectively lengthens the main landing gear during takeoff.

Additionally, the telescopic hydraulic strut assembly described by the different illustrative embodiments provides the ability to deactivate the semi-levered landing gear functions when desired to ensure equal tire loading, maximum braking capability, and optimum damping performance. Still further, the telescopic hydraulic strut assembly described by the different illustrative embodiments provides the ability to dampen rotations of the bogie beam upon touchdown and taxiing.

The description of the different illustrative embodiments has been presented for purposes of illustration and description, and is not intended to be exhaustive or limited to the illustrative embodiments in the form disclosed. Many modifications and variations will be apparent to those of ordinary skill in the art.

Further, different illustrative embodiments may provide different features as compared to other illustrative embodiments. The illustrative embodiment or embodiments selected are chosen and described in order to best explain the principles of the illustrative embodiments, the practical application, and to enable others of ordinary skill in the art to understand the disclosure for various illustrative embodiments with various modifications as are suited to the particular use contemplated.

What is claimed is:

1. A telescopic actuator assembly comprising:
a housing comprising an outer cylindrical structure and a plurality of channels configured to allow a liquid to flow through the structure;
three concentric pistons comprising a first piston, a second piston, and a third piston, wherein the first piston is disposed to slide in and out of the outer cylindrical structure, the second piston is disposed to slide in and out of the first piston, and the third piston is disposed to slide only within the outer cylindrical structure, the third piston being radially outside the first piston;
an inner cylindrical structure linked to the housing, wherein the first piston is disposed to slide against an outer periphery of the inner cylindrical structure, and wherein the second piston engages and slides in and out of the inner cylindrical structure.

2. The telescopic actuator of claim 1, further comprising a first sub-chamber within the housing and a second sub-chamber within the housing, wherein the first piston and the third piston separate the first sub-chamber and the second sub-chamber, and wherein a liquid is disposed inside both the first sub-chamber and the second sub-chamber;
a third sub-chamber disposed within the first piston and the second piston and the inner cylindrical structure, wherein the third sub-chamber contains both a gas and a liquid, and wherein the third sub-chamber is separated from the first sub-chamber by the inner cylindrical structure and the second sub-chamber by the first piston.

3. The telescopic actuator of claim 2, wherein the second piston engages with the inner cylindrical structure to divide the third sub-chamber and create a fourth sub-chamber and a fifth sub-chamber, the fourth sub-chamber and the fifth sub-chamber smaller than the third sub-chamber.

4. The telescopic actuator assembly of claim 2, wherein the second piston contains a cavity and wherein the telescopic actuator assembly further comprises:
a tube, open at both ends, connecting the cavity in the second piston with the third sub-chamber, wherein the tube extends from one side of the cavity and into the third sub-chamber, thereby connecting the two chambers and allowing gas in the third sub-chamber to expand into the cavity, and allowing liquid to remain in the third sub-chamber, and not the cavity in the second piston, and wherein an extending action of the first piston or the second piston will create decreasing pressure in third sub-chamber and draw liquid from the cavity within the second piston and return the liquid to the third sub-chamber.

5. The telescopic actuator assembly of claim 4, wherein the tube enables an amount of liquid in the third sub-chamber to be minimized and wherein the tube is positioned to lubricate a seal in the third sub-chamber, the seal located between the first piston and the inner cylindrical structure relative to the first piston and the second piston.

6. The telescopic actuator assembly of claim 1, wherein a valve manifold is connected to the housing, and wherein the manifold comprises a plurality of channels and valves configured to control flow of the liquid to or from the first sub-chamber and the second sub-chamber in order to control positions of the first piston and the third piston and to control pressure in the second sub-chamber.

7. The telescopic actuator assembly of claim 1, wherein an amount of gas in the third sub-chamber is kept constant and an amount of liquid in the third sub-chamber is kept constant.

8. The telescopic actuator assembly of claim 1, wherein the first piston, the second piston, and the third piston move together to a first position when the actuator assembly is subject to external tension loads applied between the housing and the second piston, and wherein the first piston and the second piston move together to a second position when subject to external compression loads.

9. The telescopic actuator assembly of claim 1, wherein an amount of gas within the third sub-chamber is selected to provide a first pressure that is greater than a second pressure external to the housing, and wherein the first pressure causes the first piston, the second piston, and the third piston to extend together to a first position when an externally applied compression load is below a first compression load.

10. The telescopic actuator assembly of claim 9, wherein the first piston, the second piston, and the third piston move together within the housing to a third position when an external hydraulic pressure is supplied to a valve manifold connected to the housing, wherein the valve manifold has a first configuration that reduces hydraulic pressure applied to the second chamber when an externally applied tension load at the second piston is below a first tension load.

11. The telescopic actuator assembly of claim 9, wherein the first piston, the second piston, and the third piston move together within the housing to a third position when an external hydraulic pressure is supplied to a valve manifold connected to the housing, wherein the valve manifold has a second configuration that applies full hydraulic pressure to the second chamber when an externally applied tension load at second piston is below a second tension load.

12. The telescopic actuator assembly of claim 5, wherein a gas in the third sub-chamber allows for rapid compression of the second piston under an externally applied second compression load greater than a first compression load.

13. The telescopic actuator assembly of claim 3, wherein the fourth sub-chamber contains a relief valve to allow liquid to flow from the fourth sub-chamber into the fifth sub-chamber and the second piston to extend when the first piston and the second piston are separated and an external tension load applied to second piston is greater than a third tension load.

14. The telescopic actuator assembly of claim 13 further comprising a valve manifold, wherein the actuator, the valve manifold, the gas, the liquid, form a lockable hydraulic strut and are part of a semi-levered landing gear assembly in an aircraft.

* * * * *

UNITED STATES PATENT AND TRADEMARK OFFICE
CERTIFICATE OF CORRECTION

PATENT NO. : 9,764,827 B2
APPLICATION NO. : 14/697621
DATED : September 19, 2017
INVENTOR(S) : Lindahl et al.

Page 1 of 1

It is certified that error appears in the above-identified patent and that said Letters Patent is hereby corrected as shown below:

In the Claims

Column 34, Line 54, change "in third sub-chamber" to -- in the third sub-chamber --
Column 34, Line 63, change "claim 1" to -- claim 2 --
Column 35, Line 3, change "claim 1" to -- claim 2 --
Column 35, Line 15, change "claim 1" to -- claim 2 --
Column 36, Line 10, change "a second piston" to -- the second piston --
Column 36, Line 20, change "to second piston" to -- to the second piston --

Signed and Sealed this
Eleventh Day of December, 2018

Andrei Iancu
*Director of the United States Patent and Trademark Office*